(12) United States Patent
Awoniyi-Oteri et al.

(10) Patent No.: US 12,483,316 B2
(45) Date of Patent: Nov. 25, 2025

(54) BEAM MANAGEMENT FOR A SECONDARY CELL GROUP IN A DORMANT STATE

(71) Applicant: QUALCOMM Incorporated, San Diego, CA (US)

(72) Inventors: Olufunmilola Omolade Awoniyi-Oteri, San Diego, CA (US); Jelena Damnjanovic, Del Mar, CA (US); Tao Luo, San Diego, CA (US); Peng Cheng, Beijing (CN); Punyaslok Purkayastha, San Diego, CA (US); Ozcan Ozturk, San Diego, CA (US); Junyi Li, Fairless Hills, PA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 18/002,202

(22) PCT Filed: Aug. 17, 2020

(86) PCT No.: PCT/CN2020/109511
§ 371 (c)(1),
(2) Date: Dec. 16, 2022

(87) PCT Pub. No.: WO2022/036498
PCT Pub. Date: Feb. 24, 2022

(65) Prior Publication Data
US 2023/0318681 A1  Oct. 5, 2023

(51) Int. Cl.
*H04W 76/15* (2018.01)
*H04B 7/06* (2006.01)
(Continued)

(52) U.S. Cl.
CPC ....... *H04B 7/06966* (2023.05); *H04B 7/0626* (2013.01); *H04B 7/088* (2013.01); *H04L 5/0051* (2013.01); *H04W 76/15* (2018.02)

(58) Field of Classification Search
CPC .... H04B 7/0695; H04B 7/0626; H04B 7/088; H04B 7/06966; H04L 5/0051; H04W 76/15
See application file for complete search history.

(56) References Cited

U.S. PATENT DOCUMENTS 11,483,054 B2 * 10/2022 Yu .................. H04W 72/23
2015/0215929 A1  7/2015 Damnjanovic et al.
(Continued)

FOREIGN PATENT DOCUMENTS

CN  110876209 A  3/2020
WO  WO-2020028792 A1  2/2020

OTHER PUBLICATIONS

3GPP: R1-2002051; Title: Discussion on RAN2 LS on dormant BWP configuration and related operation; Source: FUTUREWEI; pp. 1-14; Date: Apr. 20-30, 2020;. (Year: 2020).*
(Continued)

*Primary Examiner* — Fahmida S Chowdhury
(74) *Attorney, Agent, or Firm* — Muncy, Geissler, Olds & Lowe, P.C

(57) ABSTRACT

In an aspect, a UE receives, while a secondary cell group (SCG) is associated with a dormant state, at least one downlink transmit beam associated with at least one cell of the SCG. The UE determines, while the SCG is associated with the dormant state, an uplink transmit beam for a primary secondary cell (PSCell) of the SCG based on one or more of a spatial relation indication (SRI), whether there is beam correspondence between the at least one downlink transmit beam and the uplink transmit beam, a default uplink transmit beam, or a combination thereof. The UE transmits
(Continued)

a signal related to a measurement between the UE and the one or more SCells of the SCG on the determined uplink transmit beam.

14 Claims, 31 Drawing Sheets

(51) Int. Cl.
*H04B 7/08* (2006.01)
*H04L 5/00* (2006.01)

(56) References Cited

U.S. PATENT DOCUMENTS

| | | | |
|---|---|---|---|
| 2017/0142668 A1 | 5/2017 | Takeda et al. | |
| 2019/0090227 A1 | 3/2019 | Tsai et al. | |
| 2019/0182698 A1* | 6/2019 | Park | H04W 24/10 |
| 2019/0229776 A1* | 7/2019 | Cao | H04L 5/0051 |
| 2019/0280835 A1* | 9/2019 | Määttänen | H04L 5/0053 |
| 2019/0364542 A1* | 11/2019 | Tang | H04B 7/088 |
| 2020/0280409 A1* | 9/2020 | Grant | H04L 5/0044 |
| 2020/0351069 A1* | 11/2020 | Grant | H04B 7/0617 |
| 2021/0013949 A1* | 1/2021 | Agiwal | H04W 28/0278 |
| 2021/0068162 A1* | 3/2021 | Agiwal | H04L 5/0048 |
| 2021/0297126 A1* | 9/2021 | Cao | H04B 7/088 |
| 2022/0182868 A1* | 6/2022 | Rugeland | H04W 76/15 |
| 2022/0312225 A1* | 9/2022 | Li | H04B 7/088 |
| 2022/0377756 A1* | 11/2022 | Sun | H04W 76/28 |
| 2023/0232259 A1 | 7/2023 | Awoniyi-Oteri et al. | |
| 2023/0308913 A1* | 9/2023 | Matsumura | H04W 72/04 |
| 2023/0319608 A1* | 10/2023 | Matsumura | H04L 5/0053 370/252 |
| 2023/0327726 A1 | 10/2023 | Awoniyi-Oteri et al. | |

OTHER PUBLICATIONS

FUTUREWEI: "Discussion on RAN2 Ls on Dormant BWP Configuration and Related Operation", 3GPP TSG RAN WG1 #100bis-e, R1-2002051, 3rd Generation Partnership Project, Mobile Competence Centre, 650, Route Des Lucioles, F-06921 Sophia-Antipolis Cedex, France, vol. No. e-Meeting, Apr. 20, 2020-Apr. 30, 2020, Apr. 10, 2020, 14 pages, XP052342127, Sec 3, p. 4 in the last para of second agreement, p. 8, Proposal 3, p. 8 Table 1, p. 12, Table 3, Scenario 2a, p. 12, Table 3 second column, p. 11, sec 3.7, 3rd para, p. 12, sec 3.9.
Supplementary European Search Report—EP20949711—Search Authority—Munich—Apr. 3, 2024.
CATT: "SCG Dormant State", 3GPP TSG-RAN WG2 Meeting #106, R2-1905881, May 17, 2019 (May 17, 2019), 4 Pages, Section 2, The whole document.
CATT: "PUCCH on SCell for Rel-13 CA", 3GPP TSG RAN WG1 Meeting #80, R1-150101, Feb. 13, 2015 (Feb. 13, 2015), 3 Pages, the whole document.
International Search Report and Written Opinion—PCT/CN2020/109511—ISA/EPO—Apr. 26, 2021.
CATT: "Consideration on Dormant SCG State", 3GPP TSG-RAN WG2 Meeting #108, R2-1914531, 3rd Generation Partnership Project, Mobile Competence Centre, 650, Route Des Lucioles, F-06921 Sophia-Antipolis Cedex, France, vol. Ran WG2, No. Reno, USA, Nov. 18, 2019-Nov. 22, 2019, Nov. 8, 2019, XP051816597, pp. 1-3, Section 2.

* cited by examiner

USER PLANE

CONTROL PLANE

| Features | CASE A: P-CSI-RS + A-CSI-RS | CASE A: P-SRS + A-SRS | CASE B: A-CSI |
|---|---|---|---|
| DL Monitoring Opportunity | Tied to the P-CSI-RS | Tied to the P-SRS | Tied to periodic SSB |
| DL TX Beam | • Measurements using QCL source P-CSI-RS and A-CSI-RS<br>• Based on P/A CSI reports, DL TCI states can be signaled in SRI<br>• Default DL beam if no signaled TCI states | • Measurements using QCL source SSB<br>• If beam correspondence, based on UL measurements, DL TCI states can be signaled in SRI<br>• Default DL beam | • Measurements using QCL source Periodic SSB and A-CSI-RS<br>• Based on A-CSI reports, DL TCI states can be signaled in SRI<br>• Default DL beam if no signaled TCI states |
| UL TX Beam | 1. if beam correspondence, follow DL beam<br>2. If no beam correspondence, UL beam sweeping using uplink PUCCH + SRI<br>3. If no #1 and #2, UL default/common beam | 1. if beam correspondence follow DL beam<br>2. If no beam correspondence, UL beam sweep using uplink P-SRS/SRS + SRI<br>3. If no #1 and #2, UL default/common beam | 1. if beam correspondence follow DL beam<br>2. If no beam correspondence, UL beam sweep using uplink PUCCH + SRI<br>3. If no #1 and #2, UL default/common beam |
| PSCELLS/SCELL | PSCELL (DL and UL) | PSCELL only (UL, DL+UL if correspondence) | PSCELL (DL+UL) and SCELL (DL) |

FIG. 26

BEAM MANAGEMENT FOR A SECONDARY CELL GROUP IN A DORMANT STATE

CROSS-REFERENCE TO RELATED APPLICATIONS

The present Application for Patent claims priority to International Patent Application No. PCT/CN2020/109511, entitled "BEAM MANAGEMENT FOR A SECONDARY CELL GROUP IN A DORMANT STATE", filed Aug. 17, 2020, and assigned to the assignee hereof and hereby expressly incorporated herein by reference in its entirety.

BACKGROUND OF THE DISCLOSURE

1. Field of the Disclosure

Aspects of the disclosure relate generally to wireless communications, and more particularly to beam management for a secondary cell group in a dormant state.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

An aspect is directed to a method of operating a user equipment (UE), comprising receiving, while a secondary cell group (SCG) is associated with a dormant state, at least one downlink transmit beam associated with at least one cell of the SCG. determining, while the SCG is associated with the dormant state, an uplink transmit beam for a primary secondary cell (PSCell) of the SCG based on one or more of a spatial relation indication (SRI), whether there is beam correspondence between the at least one downlink transmit beam and the uplink transmit beam, a default uplink transmit beam, or a combination thereof, and transmitting a signal related to a measurement between the UE and the PSCell and/or the one or more SCells of the SCG on the determined uplink transmit beam.

Another aspect is directed to a user equipment (UE), comprising means for receiving, while a secondary cell group (SCG) is associated with a dormant state, at least one downlink transmit beam associated with at least one cell of the SCG, means for determining, while the SCG is associated with the dormant state, an uplink transmit beam for a primary secondary cell (PSCell) of the SCG based on one or more of a spatial relation indication (SRI), whether there is beam correspondence between the downlink transmit beam and the uplink transmit beam, a default uplink transmit beam, or a combination thereof, and means for transmitting a signal related to a measurement between the UE and the one or more SCells of the SCG on the determined uplink transmit beam.

Another aspect is directed to a user equipment (UE), comprising a memory, at least one transceiver, and at least one processor communicatively coupled to the memory and the at least one transceiver, the at least one processor configured to receive, while a secondary cell group (SCG) is associated with a dormant state, at least one downlink transmit beam associated with at least one cell of the SCG, determine, while the SCG is associated with the dormant state, an uplink transmit beam for a primary secondary cell (PSCell) of the SCG based on one or more of a spatial relation indication (SRI), whether there is beam correspondence between the downlink transmit beam and the uplink transmit beam, a default uplink transmit beam, or a combination thereof, and transmit a signal related to a measurement between the UE and the one or more SCells of the SCG on the determined uplink transmit beam.

Another aspect is directed to a non-transitory computer-readable medium containing instructions stored thereon, for causing at least one processor in a user equipment (UE) to receive, while a secondary cell group (SCG) is associated with a dormant state, at least one downlink transmit beam associated with at least one cell of the SCG, determine, while the SCG is associated with the dormant state, an uplink transmit beam for a primary secondary cell (PSCell) of the SCG based on one or more of a spatial relation indication (SRI), whether there is beam correspondence between the downlink transmit beam and the uplink transmit beam, a default uplink transmit beam, or a combination thereof, and transmit a signal related to a measurement between the UE and the one or more SCells of the SCG on the determined uplink transmit beam.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 26 depicts a table summarizing the various beam management aspects of FIGS. 22-25 in accordance with an aspect of the disclosure.

DETAILED DESCRIPTION

Figure 1:
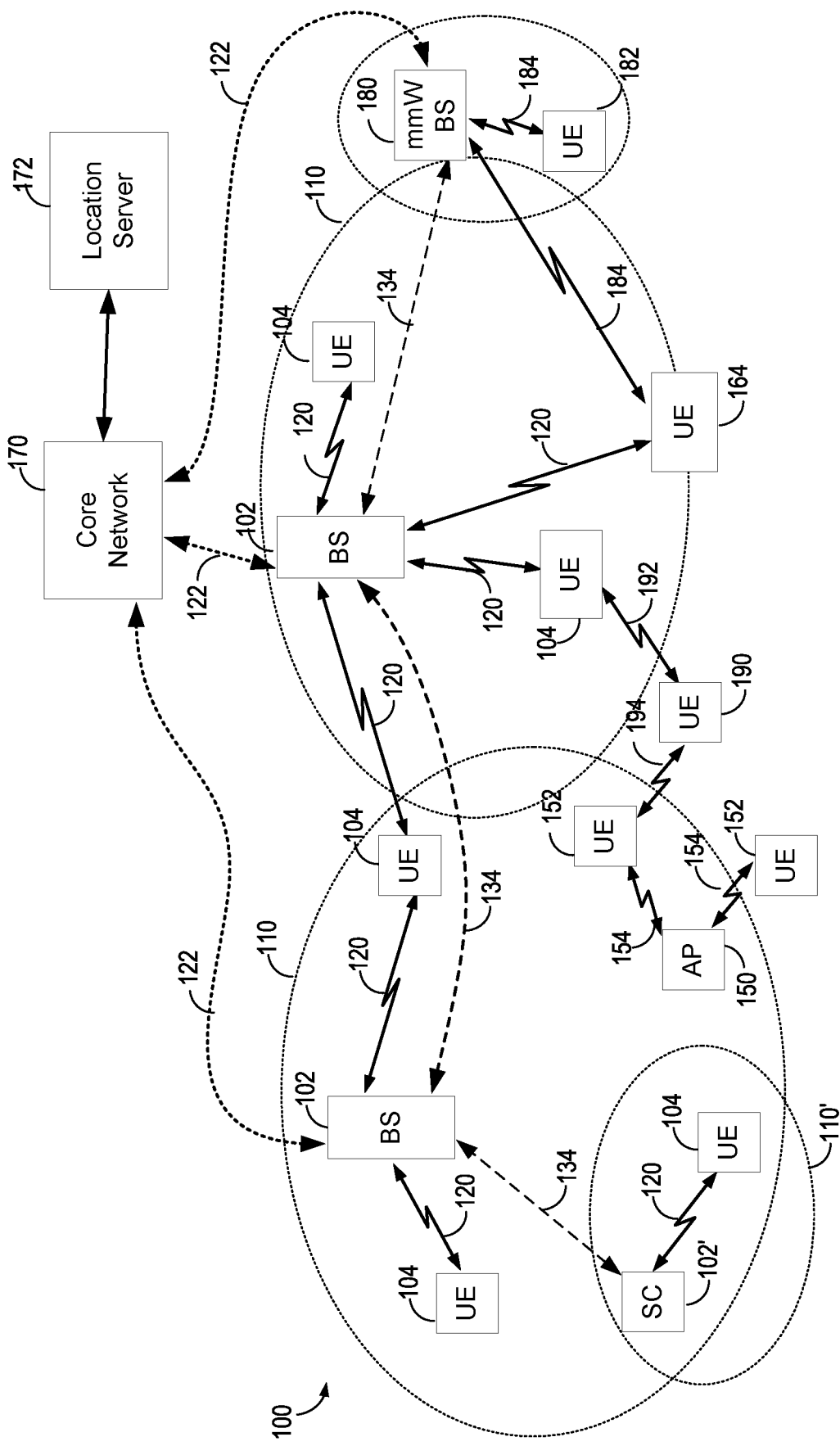
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communications device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. In some systems, a base station may correspond to a Customer Premise Equipment (CPE) or a road-side unit (RSU). In some designs, a base station may correspond to a high-powered UE (e.g., a vehicle UE or VUE) that may provide limited certain infrastructure functionality. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/ 182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
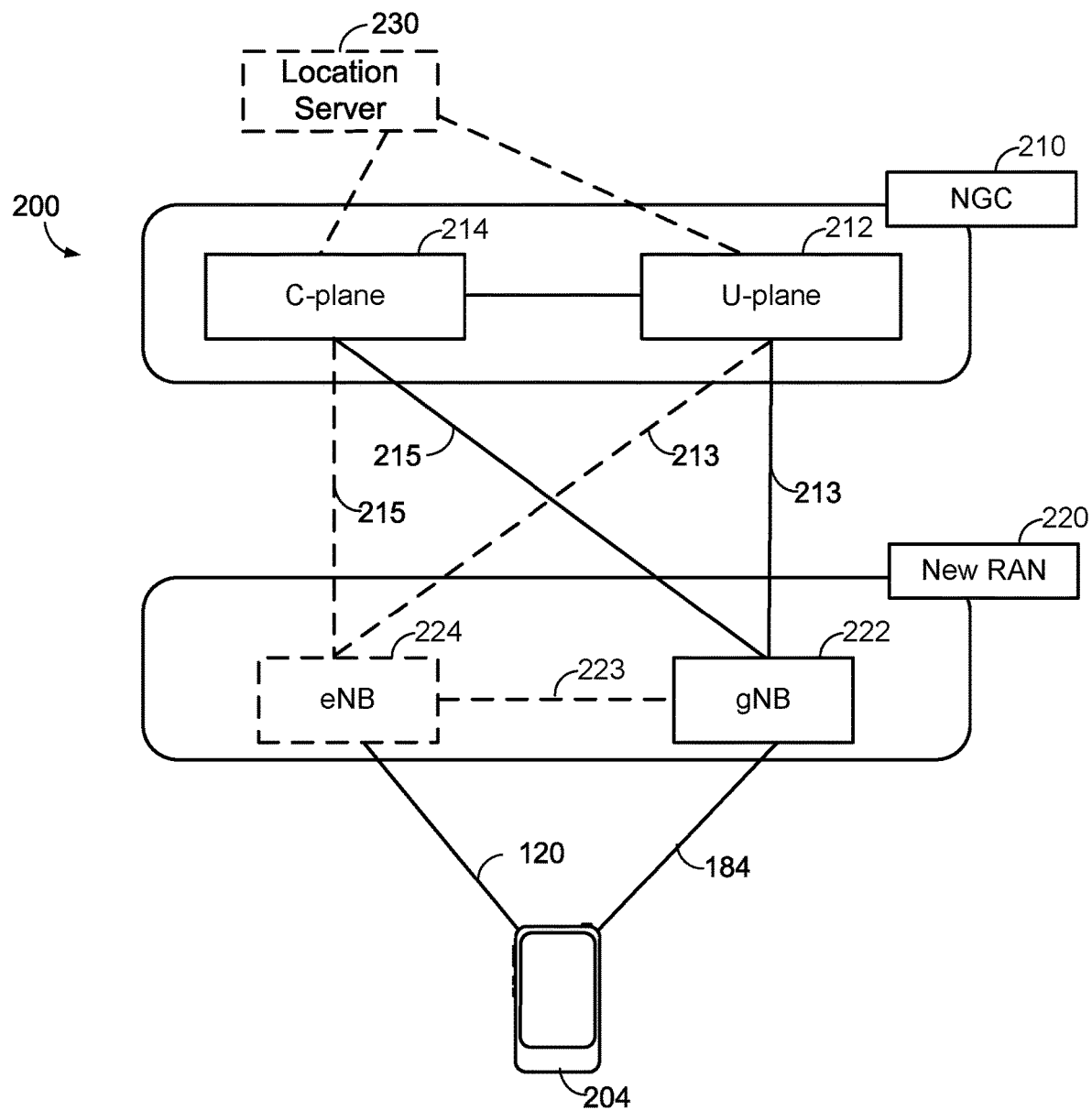
FIGS. 2A and 2B illustrate example wireless network structures, according to various aspects.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
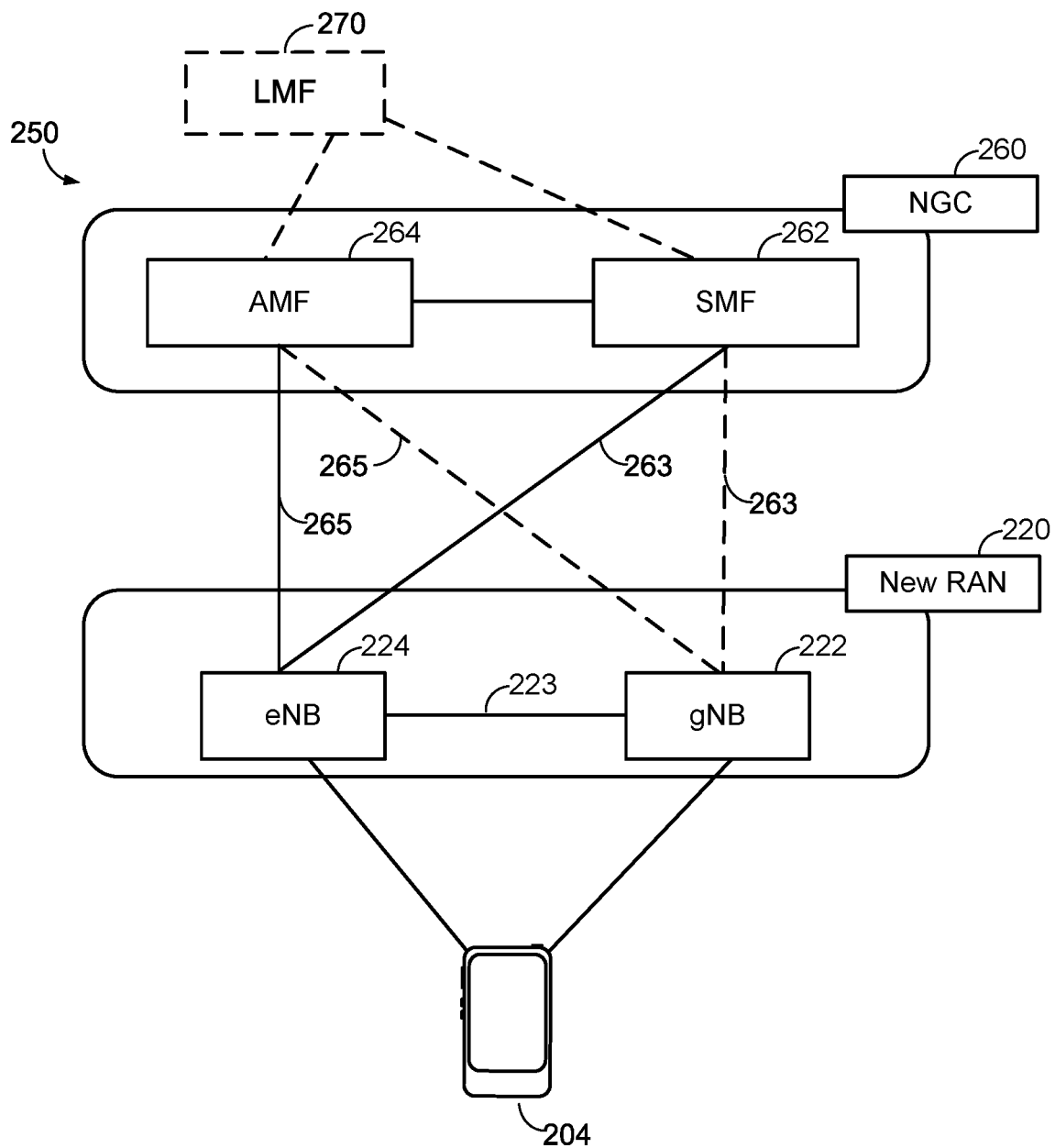

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
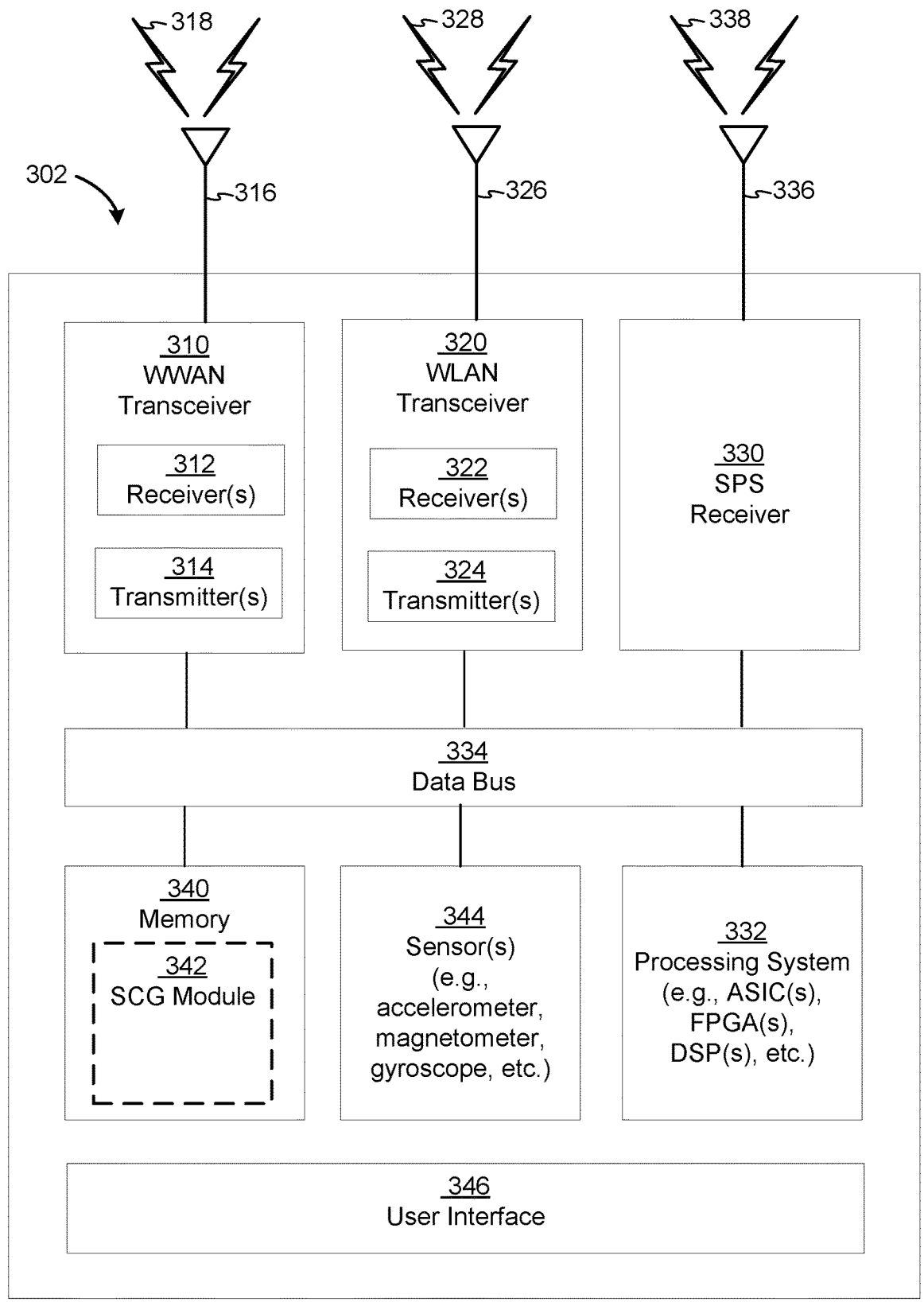
FIGS. 3A to 3C are simplified block diagrams of several sample aspects of components that may be employed in wireless communication nodes and configured to support communication as taught herein.
Figure 3B:
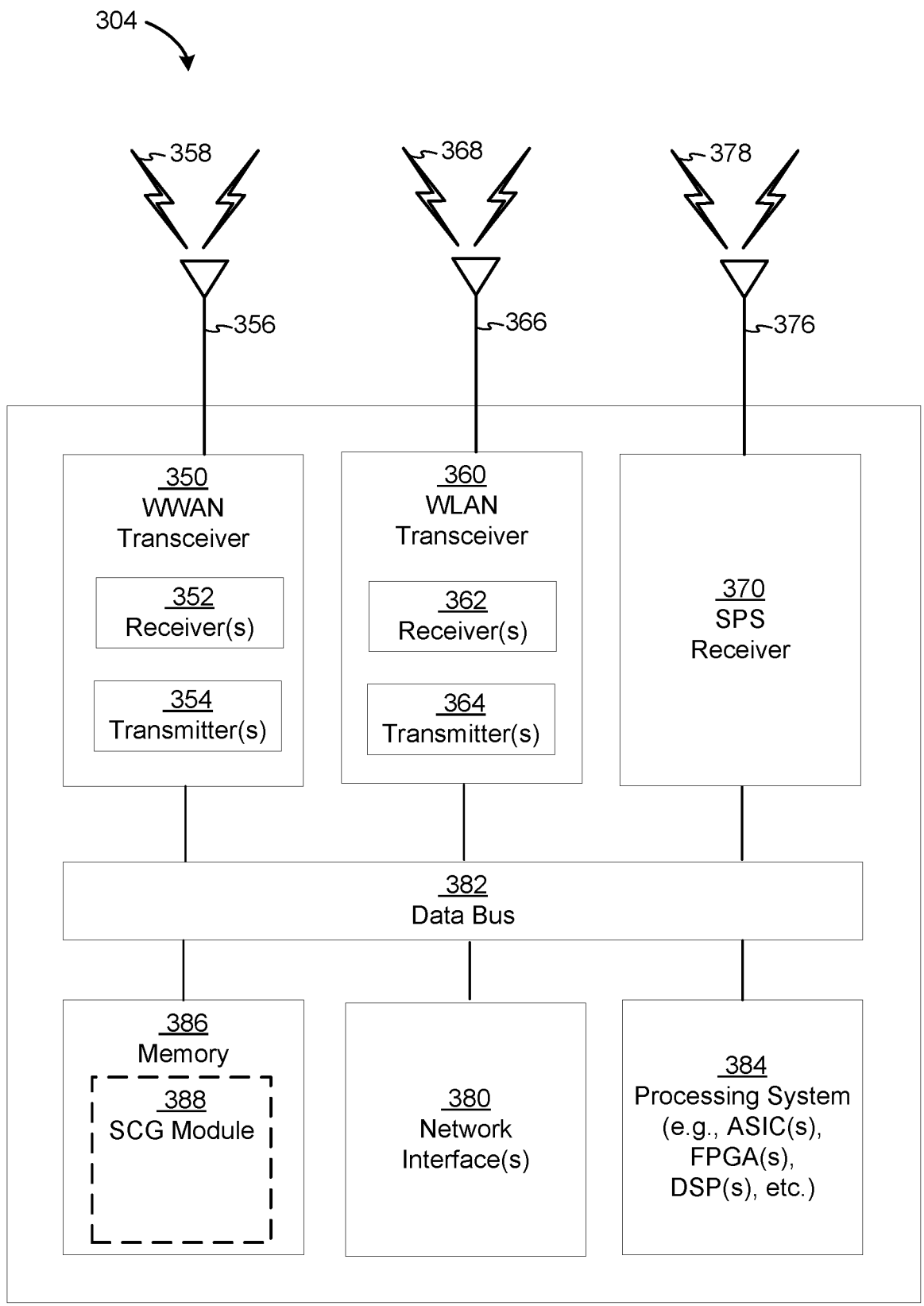
Figure 3C:
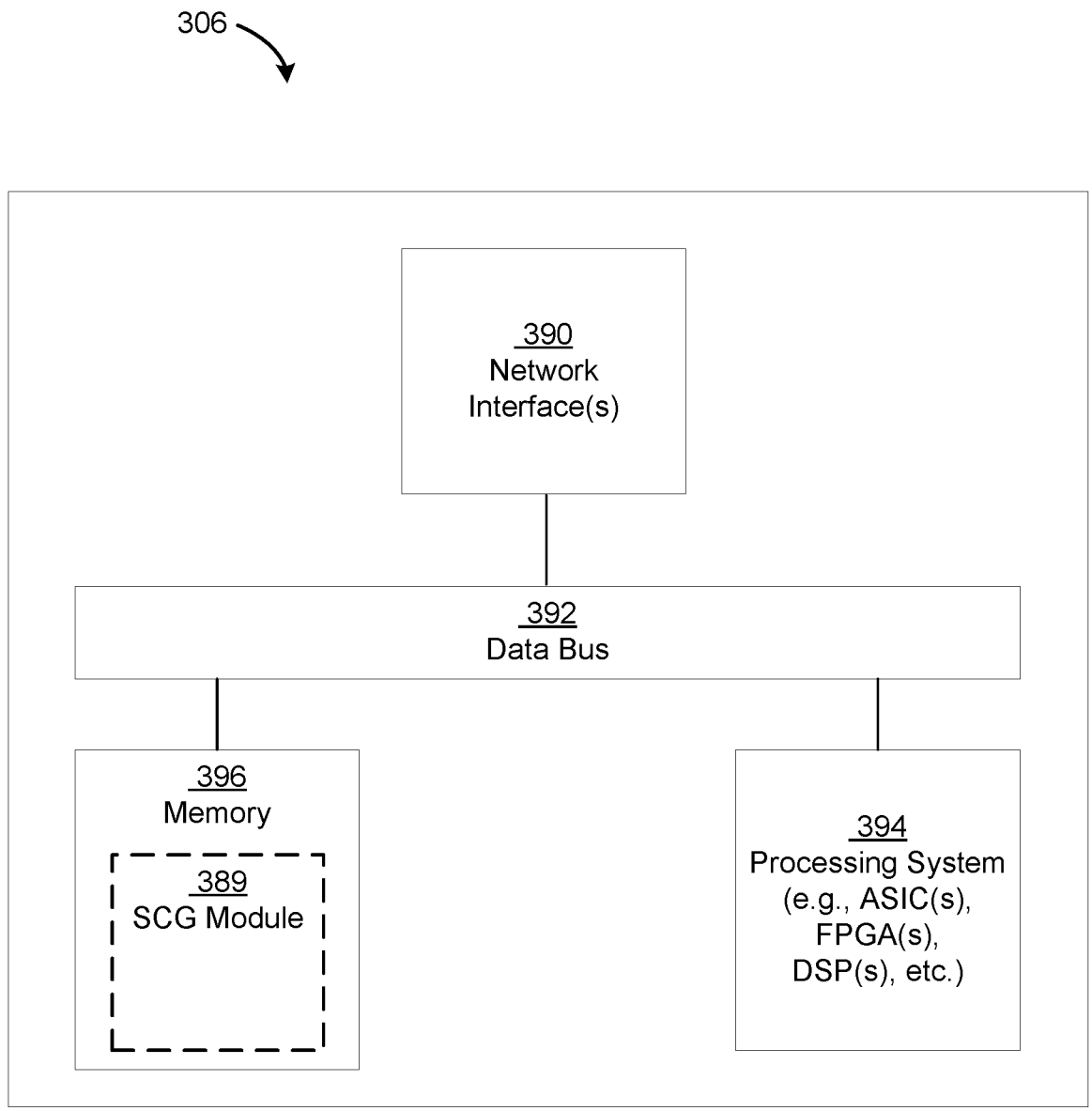

FIGS. 3A, 3B, and 3C illustrate several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including a transmitter and a receiver may comprise an integrated device (e.g., embodied as a transmitter circuit and a receiver circuit of a single communications device) in some implementations, may comprise a separate transmitter device and a separate receiver device in some implementations, or may be embodied in other ways in other implementations. In an aspect, a transmitter may include or be coupled to a plurality of antennas (e.g., antennas 316, 336, and 376), such as an antenna array, that permits the respective apparatus to perform transmit "beamforming," as described herein. Similarly, a receiver may include or be coupled to a plurality of antennas (e.g., antennas 316, 336, and 376), such as an antenna array, that permits the respective apparatus to perform receive beamforming, as described herein. In an aspect, the transmitter and receiver may share the same plurality of antennas (e.g., antennas 316, 336, and 376), such that the respective apparatus can only receive or transmit at a given time, not both at the same time. A wireless communications device (e.g., one or both of the transceivers 310 and 320 and/or 350 and 360) of the apparatuses 302 and/or 304 may also comprise a network listen module (NLM) or the like for performing various measurements.

The apparatuses 302 and 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine the apparatus' 302 and 304 positions using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving: messages, parameters, or other types of information.

The apparatuses 302, 304, and 306 also include other components that may be used in conjunction with the operations as disclosed herein. The UE 302 includes processor circuitry implementing a processing system 332 for providing functionality relating to, for example, false base station (FBS) detection as disclosed herein and for providing other processing functionality. The base station 304 includes a processing system 384 for providing functionality relating to, for example, FBS detection as disclosed herein and for providing other processing functionality. The network entity 306 includes a processing system 394 for providing functionality relating to, for example, FBS detection as disclosed herein and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 include memory circuitry implementing memory components 340, 386, and 396 (e.g., each including a memory device), respectively, for maintaining information (e.g., information indicative of reserved resources, thresholds, parameters, and so on). In some cases, the apparatuses 302, 304, and 306 may include secondary cell group (SCG) modules 342, 388 and 389, respectively. The SCG modules 342, 388 and 389 may be hardware circuits that are part of or coupled to the processing systems 332, 384, and 394, respectively, that, when executed, cause the apparatuses 302, 304, and 306 to perform the functionality described herein. Alternatively, the SCG modules 342, 388 and 389 may be memory modules (as shown in FIGS. 3A-C) stored in the memory components 340, 386, and 396, respectively, that, when executed by the processing systems 332, 384, and 394, cause the apparatuses 302, 304, and 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the GPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the apparatuses 302, 304, and/or 306 are shown in FIGS. 3A-C as including various components that may be configured according to the various examples described herein. It will be appreciated, however, that the illustrated blocks may have different functionality in different designs.

The various components of the apparatuses 302, 304, and 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 389 may be implemented by processor and memory component(s) of the base station 304 (e.g., by execution of appropriate code and/or by appropriate configuration of processor components). Also, some or all of the functionality represented by blocks 390 to 396 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the SCG modules 342, 388 and 389, etc.

Figure 4A:
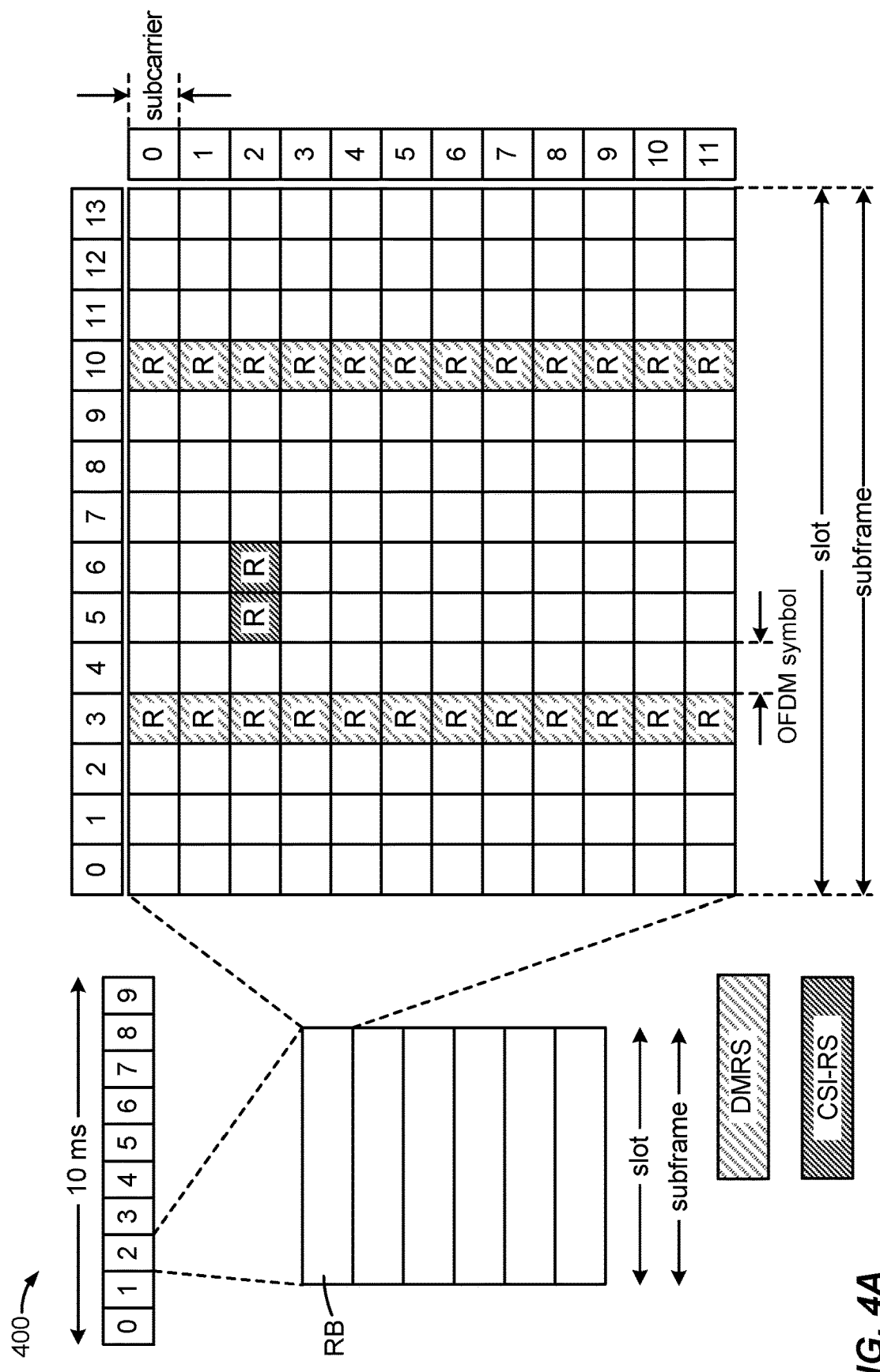
FIGS. 4A and 4B are diagrams illustrating examples of frame structures and channels within the frame structures, according to aspects of the disclosure.
Figure 4B:
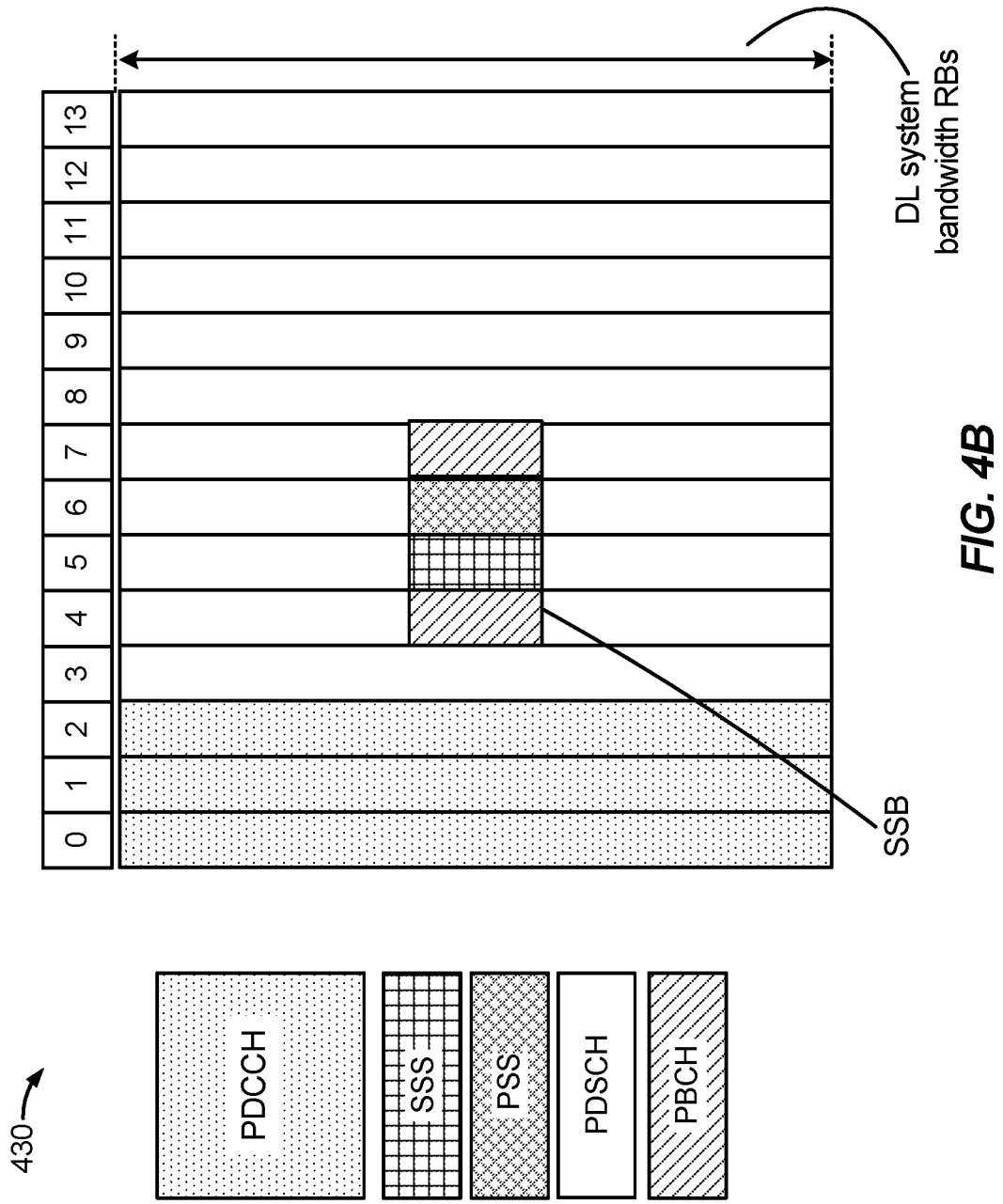

FIG. 4A is a diagram 400 illustrating an example of a DL frame structure, according to aspects of the disclosure. FIG. 4B is a diagram 430 illustrating an example of channels within the DL frame structure, according to aspects of the disclosure. Other wireless communications technologies may have a different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast NR may support multiple numerologies, for example, subcarrier spacing of 15 kHz, 30 kHz, 60 kHz, 120 kHz and 204 kHz or greater may be available. Table 1 provided below lists some various parameters for different NR numerologies.

TABLE 1

| Subcarrier spacing (kHz) | Symbols/ slot | slots/ sub- frame | slots/ frame | slot (ms) | Symbol duration (µs) | Max. nominal system BW (MHz) with 4K FFT size |
| --- | --- | --- | --- | --- | --- | --- |
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 240 | 14 | 16 | 160 | 0.0625 | 4.17 | 800 |

In the examples of FIGS. 4A and 4B, a numerology of 15 kHz is used. Thus, in the time domain, a frame (e.g., 10 ms) is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 4A, some of the REs carry DL reference (pilot) signals (DL-RS) for channel estimation at the UE. The DL-RS may include demodulation reference signals (DMRS) and channel state information reference signals (CSI-RS), exemplary locations of which are labeled "R" in FIG. 4A.

FIG. 4B illustrates an example of various channels within a DL subframe of a frame. The physical downlink control channel (PDCCH) carries DL control information (DCI) within one or more control channel elements (CCEs), each CCE including nine RE groups (REGs), each REG including four consecutive REs in an OFDM symbol. The DCI carries information about UL resource allocation (persistent and non-persistent) and descriptions about DL data transmitted to the UE. Multiple (e.g., up to 8) DCIs can be configured in the PDCCH, and these DCIs can have one of multiple formats. For example, there are different DCI formats for UL scheduling, for non-MIMO DL scheduling, for MIMO DL scheduling, and for UL power control.

A primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the DL system bandwidth and a system frame number (SFN). The physical downlink shared channel (PDSCH) carries user data, broadcast system information not transmitted through the PBCH such as system information blocks (SIBs), and paging messages.

Figure 5A:
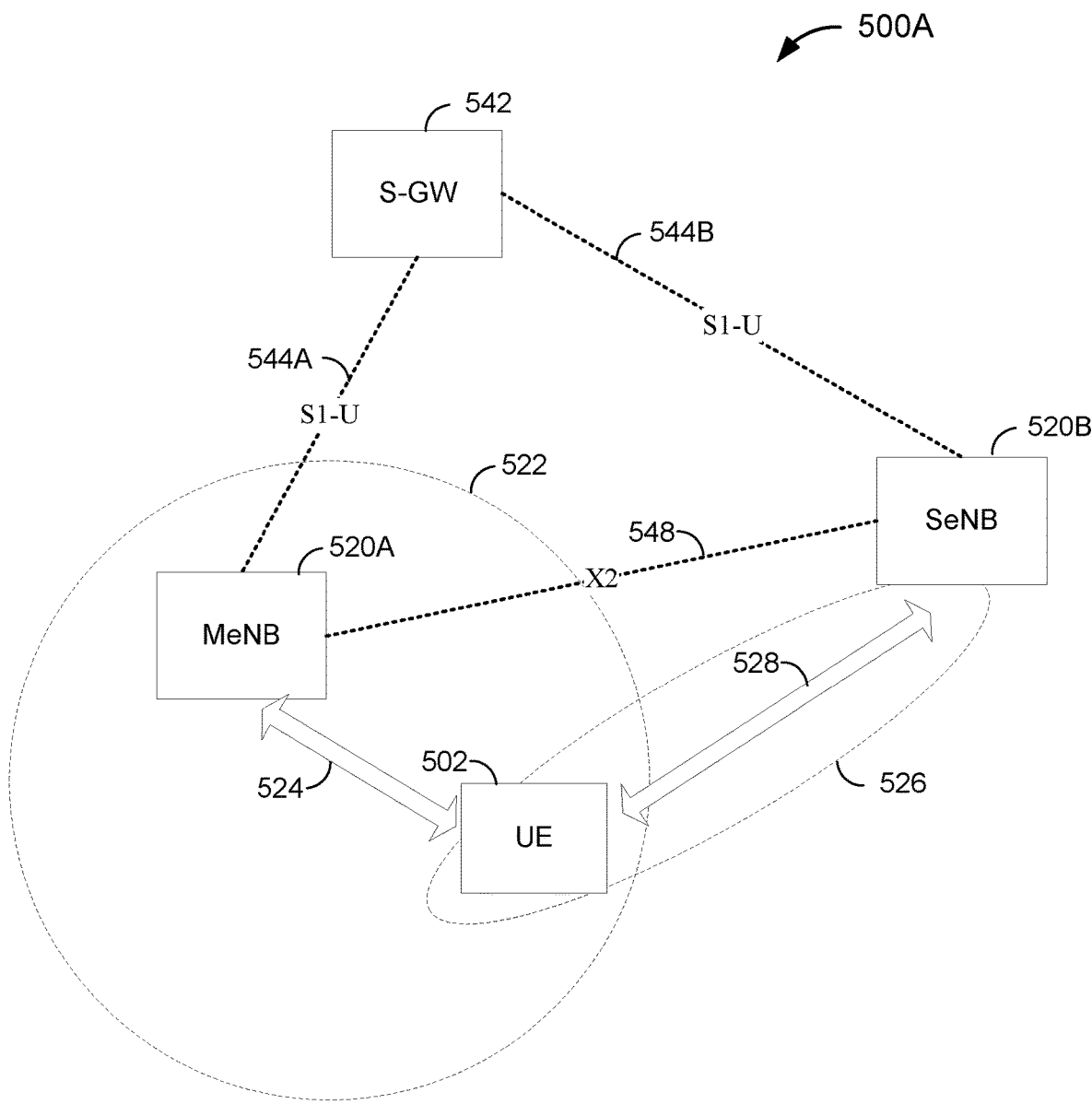
FIG. 5A depicts a wireless communications system 500A showing user plane connectivity supporting dual connectivity for a UE 502 (which may correspond to any of the above-described UEs, such as UE 302).

FIG. 5A depicts a wireless communications system 500A showing user plane connectivity supporting dual connectivity for a UE 502 (which may correspond to any of the above-described UEs, such as UE 302). When configured for dual connectivity, the UE 502 may be connected to a primary or master node, referred to as a master cell group (MCG) node, and to one or more secondary nodes, referred to as secondary cell group (SCG) nodes. The MCG and SCG are referred to as cell "groups" because, as will be appreciated, a base station typically supports multiple (e.g., three) cells, and a UE (e.g., UE 502) may communicate with one or more of them (e.g., via carrier aggregation, mobility, etc.). In the example of FIG. 5A, the UE 502 is connected to a master evolved Node B (MeNB) 520A via a communication link 524, and to a secondary evolved Node B (SeNB) 520B via a communication link 528 (collectively, base stations 520). With reference to FIG. 1, the MeNB 520A may be correspond to any of the above-described BSs, such as BS 304.

The communication links 524 and 528 may include uplink (UL) (also referred to as reverse link) transmissions from the UE 502 to the base stations 520 and/or downlink (DL) (also referred to as forward link) transmissions from the base stations 520 to the UE 502. The communication links 524 and 528 may use multiple-input and multiple-output (MIMO) antenna technology, including spatial multiplexing, beamforming, and/or transmit diversity. The communication links 524 and 528 may be through one or more carrier frequencies (also referred to as "component carriers" or simply "carriers").

In an exemplary aspect, the SeNB 520B may operate in a licensed and/or an unlicensed frequency spectrum. When operating in an unlicensed frequency spectrum, the SeNB 520B may employ NR and use the same 5 GHz unlicensed frequency spectrum as used by WLAN access points. The SeNB 520B, employing NR in an unlicensed frequency spectrum, may boost coverage to and/or increase capacity of the wireless communications system 500A.

Some wireless communications systems, such as NR systems, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput, such as up to 6 gigabits per second (Gbps). In the wireless communications system 500A, the SeNB 520B may operate in mmW frequencies and/or near mmW frequencies in communication with a mmW and/or near mmW-capable UE (e.g., UE 502). When the SeNB 520B/UE 502 operates in mmW or near mmW frequencies, the SeNB 520B may be referred to as a mmW base station or mmW SeNB. Near mmW may extend down to a frequency of 3 GHz with a wavelength of 100 millimeters. Super high frequency (SHF) bands extends between 3 GHz and 30 GHz, and are also referred to as centimeter wave.

One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz, or 5 GHz bands. The mmW SeNB 520B and/or the UE 502 may utilize beamforming over communication link 528 to compensate for the extremely high path loss and short range.

Transmitters (e.g., SeNB 520B/UE 502) may use beamforming to extend radio frequency (RF) signal coverage. Transmit beamforming is a technique for focusing an RF signal in a specific direction. Traditionally, when a transmitter (e.g., MeNB 520A) broadcasts an RF signal, it broadcasts the signal in all directions (omni-directionally; hence, the circular shape of PCell 522). With transmit beamforming, the transmitter (e.g., SeNB 520B) determines where a given target device (e.g., UE 502) is located (relative to the transmitter) and projects a stronger downlink RF signal in that specific direction (hence the oval shape of SCell 526), thereby providing a faster (in terms of data rate) and stronger RF signal for the receiving device(s). To change the directionality of the RF signal when transmitting, a transmitter can control the phase and relative amplitude of the RF signal at each transmission point (e.g., antenna). For example, a transmitter may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

The base stations 520/UE 502 may use spectrum up to Y MHz (e.g., 5, 10, 15, 20, 100 MHz) bandwidth per carrier allocated in a carrier aggregation (CA) of up to a total of Yx MHz (x component carriers) used for transmission in each direction. The component carriers may or may not be adjacent to each other on the frequency spectrum. Allocation of carriers may be asymmetric with respect to the DL and UL (e.g., more or less carriers may be allocated for DL than for UL).

The component carriers may include a primary component carrier and one or more secondary component carriers. The primary component carrier may be referred to as the "active carrier frequency" or the primary cell (PCell), and the secondary component carrier(s) may be referred to as secondary cell(s) (SCell(s)). In order to operate on multiple carrier frequencies, a base station 520/UE 502 is equipped with multiple receivers and/or transmitters. For example, a UE may have two receivers, Receiver 1 and Receiver 2, where Receiver 1 is a multi-band receiver that can be tuned to band (i.e., carrier frequency) X or band Y, and Receiver 2 is a one-band receiver tuneable to band Z only. In this example, if the UE is being served in band X, band X would be referred to as the PCell or the active carrier frequency, and Receiver 1 would need to tune from band X to band Y (an SCell) in order to measure band Y (and vice versa). In contrast, whether the UE is being served in band X or band Y, because of the separate Receiver 2, the UE can measure band Z without interrupting the service on band X or band Y. The simultaneous transmission and/or reception of multiple carriers enables a UE 502 to significantly increase its data transmission and/or reception rates.

In carrier aggregation, one of the frequencies utilized by a base station 520 may be the PCell for the UE 502 and other frequencies utilized by the base station 520 may be SCells. For example, one of the frequencies utilized by the base station 520A may be assigned to the UE 502 as that UE's PCell, and other frequencies utilized by the base station 520A may be assigned as SCells, whereas one of the frequencies assigned to the UE 502 as an SCell may be assigned to a second UE (not shown) as that UE's PCell, and other frequencies utilized by the base station 520A, including the PCell assigned to the UE 502, may be assigned to the second UE as SCells.

Dual connectivity, however, is used to achieve carrier aggregation between different base stations, and possibly different radio access technologies (RATs), rather than different cells supported by the same base station. Dual connectivity is well-suited in heterogeneous networks (e.g., a network of macro cells and small cells), but can also be used in homogenous networks (e.g., a network of all macro cells). In the example of FIG. 5A, the UE 502 is in the PCell 522 served by the MeNB 520A and the SCell 526 served by the SeNB 520B. Although the present disclosure uses the terms "MeNB" and "SeNB," as will be appreciated, the MeNB 520A and the SeNB 520B need not both utilize the same RAT (e.g., LTE), but rather, may utilize different RATs. For example, the MeNB 520A may be a macro cell operating according to LTE, and the SeNB 520B may be a small cell base station operating according to 5G NR.

The wireless communications system 500A may further include other network nodes such as a serving gateway (SGW) 542. The serving gateway 542 may support a user plane interface, such as a S1-U 544A/544B with base stations 520. The SGW 542 may also support a control plane interface to a mobility management entity (MME) (shown in FIG. 5B).

Figure 5B:
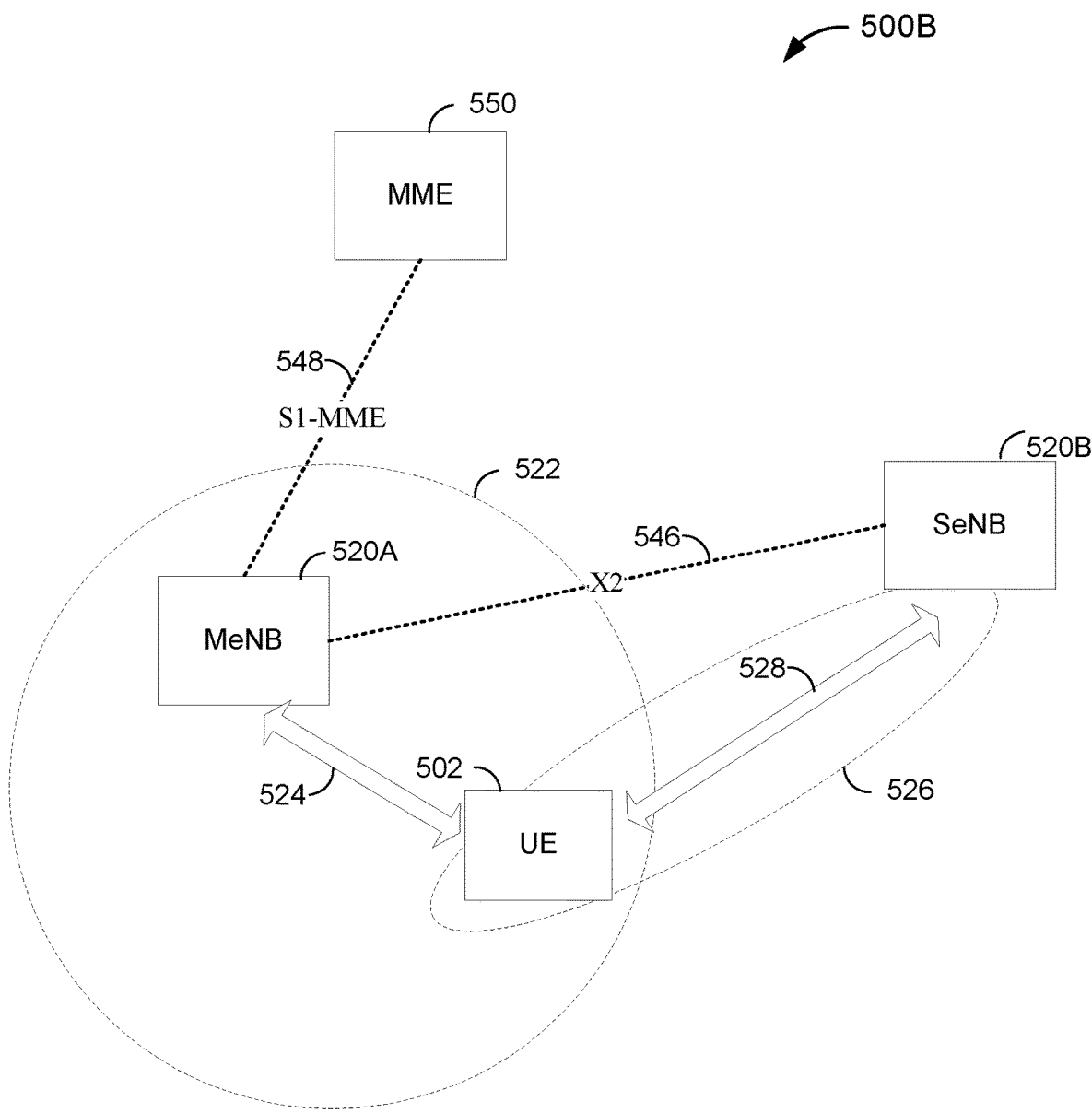
FIG. 5B depicts a wireless communications system 500B showing control plane connectivity supporting dual connectivity for the UE 502.

FIG. 5B depicts a wireless communications system 500B showing control plane connectivity supporting dual connectivity for the UE 502. In the example of FIG. 5B, the S1-MME 548 interface between the MME 550 and the MeNB 520A may be used as a control plane for controlling the dual connectivity provided to UE 502. The control plane signaling may also include an interface (not shown) between the MME 550 and the SGW 542.

In the case of dual connectivity, there may different bearer options, including a split bearer option and a secondary cell group (SCG) bearer option. For split bearers, for example, the S1-U interface 544A connection to the SGW 542 may be terminated in the MeNB 520A, and the MeNB 520A may split some of the user plane traffic toward the SeNB 520B via the X2 interface 546. In the case of SCG bearers, for example, the SeNB 520B may be directly connected to a core network (e.g., the SGW 542 of the core network via the S1-U interface 544A), while the MeNB 520A may not be not involved in the transport of user plane data for this type of bearer(s) over the Uu interface (i.e., the radio interface).

The MeNB 520A is responsible for radio resource control (RRC) layer (referred to as "layer 3" or L3) signaling for the UE 502. However, both the MeNB 520A and the SeNB 520B have different physical downlink control channels (PDCCHs) and physical downlink shared channels (PDSCHs). Data for the UE 502 is split at the packet data convergence protocol (PDCP) layer, but unlike carrier aggregation, the radio link control (RLC) layer and the medium access control (MAC) layer are different for the MeNB 520A and the SeNB 520B (the PDCP, RLC, and MAC layers are collectively referred to as "layer 2" or L2).

In multi-RAT Dual Connectivity (MR-DC) for 3GPP Rel. 17, deactivation/suspension of the SCG during periods of bursty traffic, UE overheating and/or special traffic types (e.g. VOIP) may be implemented. The goal of SCG suspension is to reduce activation/deactivation latency and to save power at the UE. In some cases, SCG suspension is preferred over deactivation due to minimal activation delay in comparison with SCG activation delay of over 79 ms. To address this issue, the notion of "SCG dormancy" has been considered as an SCG suspension mode.

Some of the features in carrier aggregation (CA) SCell Dormancy which WERE standardized in 3GPP NR Rel. 16 can be leveraged for SCG dormancy while others may not. In CA SCell Dormancy, SCells are in a dormant state with no DL monitoring or UL channel transmission. In CA SCell Dormancy, RRM, RLM and L1 measurements are allowed and the measurement reporting are performed through the primary secondary cell (PSCell) of the SCG which remains in an active state.

During SCG dormancy, measurements can be made on PSCell or SCells in SCG dormancy. During SCG dormancy, the MCG is not dormant, so even though reporting of some measurements (e.g., L3 measurements) could be performed through MCG, various problems may occur if such an implementation is attempted, e.g.:

Synchronization: MCG and SCG might not be synchronized, so the L1 measurements could be inaccurate Extensive Modification: The modification may be required to send L1 measurements between the MN and SN would be significant.

Latency: The latency involved especially for L1 measurements could be prohibitive.

In some designs, during SCG dormancy, the PSCell may be characterized as being "semi-dormant". Some measurement reporting (e.g., L1 measurements for PSCell and SCell) can be performed using the PSCell of the SCG using PUCCH/PUSCH. DL channels (PDCCH/PDSCH) may also be activated on the PSCell. When PSCell is used for measurement reporting, some power consumption is traded off with performance and reporting latency during SCG dormancy. This may reduce the latency incurred and improve performance when bringing SCG out of dormancy especially, in scenarios where the dormant bandwidth part (BWP) and non-dormant BWP(s) overlaps.

In some designs, only periodic measurements are typically triggered in CA SCell dormancy. However, if the PSCell is in a semi-dormant state in SCG dormancy, aperiodic measurements may be used. For example, aperiodic measurements may be useful for improved power savings because measurements do not need to be triggered alongside with the start of dormancy, but opportunistically based on when measurements are required for tracking purposes on the PSCell and SCells. One or more embodiments are thereby directed to triggering aperiodic measurements (e.g., L1 measurements, L3 measurements, etc.) on SCell(s) of an SCG while the SCG is in a dormant state. Such embodiments may provide various technical advantages, such as providing an opportunity for measurements to support tracking during SCG dormancy without significantly increasing power consumption at the UE.

At a high-level, aperiodic measurements may be implemented during SCG dormancy either in conjunction with periodic measurements or without periodic measurements. As used herein, aperiodic measurements being implemented in conjunction with periodic measurements during SCG dormancy is referred to as "CASE A" and aperiodic measurements being implemented without periodic measurements during SCG dormancy is referred to as "CASE B".

In some designs, with regard to CASE A, when entering dormancy, periodic L1 measurements need not be triggered on all the cells of the SCG. For example, periodic measurements may be supported for the PSCell at the beginning of SCG dormancy or during the SCG dormancy duration. In some designs, aperiodic measurements may be triggered on the PSCell as well. Since SCell are not used for transport of user plane data during SCG dormancy, little to no tracking is required so no periodic measurements is required. Aperiodic measurements may then be triggered on SCells before these cells are brought out of dormancy in scenarios.

In some designs, with regard to CASE B, aperiodic measurements can be triggered on PSCell and SCells through the PCells when tracking is required. The aperiodic measurements can be reported either before SCG dormancy deactivation message (e.g., minimal latency with moderate signaling) or with the dormancy deactivation message (e.g., moderate latency with minimal signaling).

Figure 6:
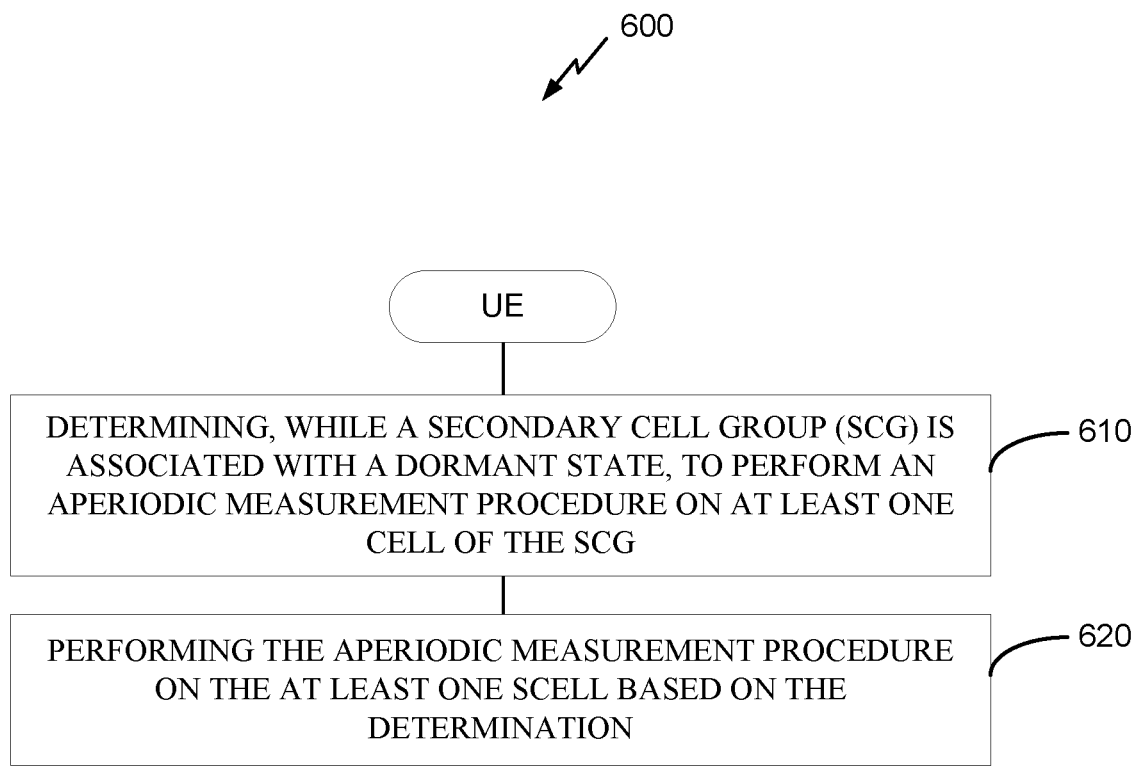
FIG. 6 illustrates an exemplary process of wireless communication, according to aspects of the disclosure.

FIG. 6 illustrates an exemplary process 600 of wireless communication, according to aspects of the disclosure. In an aspect, the process 600 may be performed by a UE, such as any of the UEs described above (e.g., UE 302, etc.).

At 610, UE 302 (e.g., processing system 332, SCG module 342, etc.) determines, while an SCG is associated with a dormant state, to perform an aperiodic measurement procedure on at least one cell (e.g., SCell(s), PSCell, etc.) of the SCG. In some designs, the aperiodic measurement procedure comprises measurement of one or more downlink reference signals (e.g., aperiodic CSI-RS or A-CSI-RS) on the at least one cell, transmission of one or more uplink reference signals (e.g., aperiodic SRS or A-SRS) on a PSCell of the SCG, or a combination thereof. In some designs, the determination of 610 may be responsive to receipt of an A-CSI-RS over the PSCell during a DL monitoring window. As will explained in more detail below, the determination at 610 may be triggered (or originated) at a master node (MN) (or MeNB), a secondary node (SN) (or SeNB), or UE 302 itself.

At 620, UE 302 (e.g., receiver 312, receiver 322, transmitter 314, transmitter 314, etc.) performs the aperiodic measurement procedure on the at least one cell based on the determination. In some designs, the aperiodic measurement procedure is performed on the PSCell of the SCG, one or more SCells of the SCG, or a combination thereof.

Figure 7:
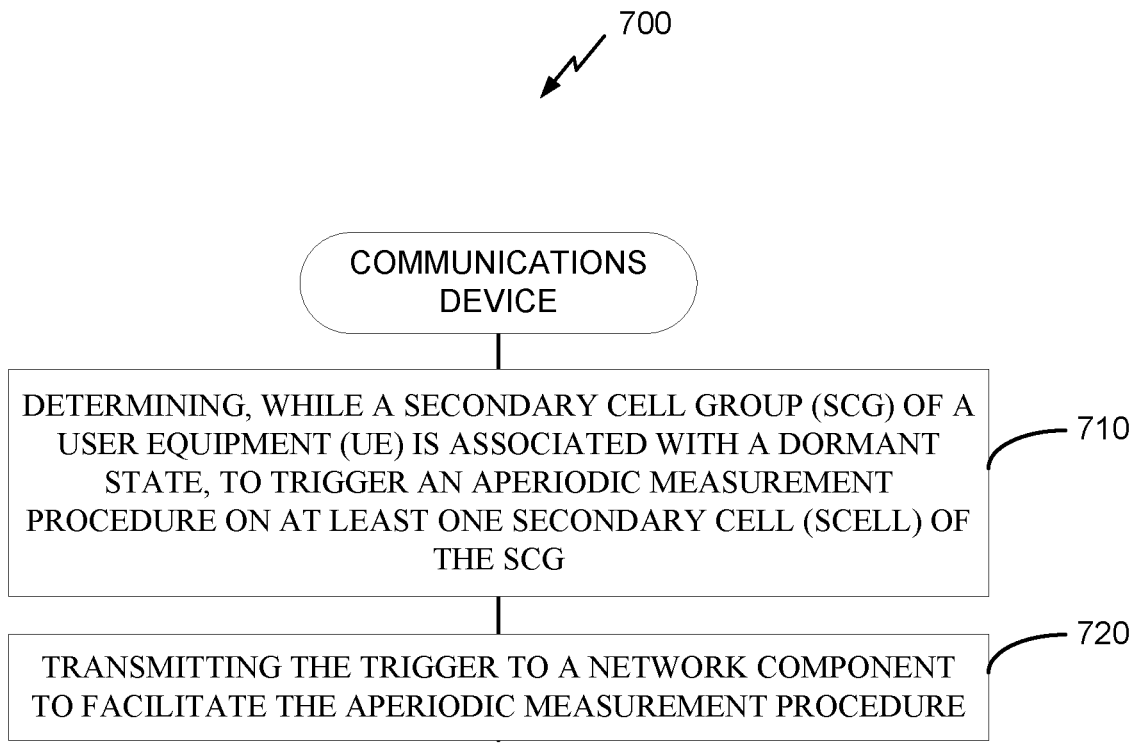
FIG. 7 illustrates an exemplary process of wireless communication, according to aspects of the disclosure.

FIG. 7 illustrates an exemplary process 700 of wireless communication, according to aspects of the disclosure. In an aspect, the process 700 may be performed by a communications device, such as any of the UEs described above (e.g., UE 302, etc.), a master node (MN) (e.g., an MeNB, which may correspond to BS 304), a secondary node (e.g., SeNB, which may correspond to BS 304), and so on.

At 710, the communications device (e.g., processing systems 332, 384 or 394, SCG modules 342, 388 or 389, etc.) determines, while a SCG of a UE is associated with a dormant state, to trigger an aperiodic measurement procedure on at least one cell (e.g., SCell(s), PSCell, etc.) of the SCG. In some designs, the aperiodic measurement procedure comprises measurement of one or more downlink reference signals (e.g., aperiodic CSI-RS or A-CSI-RS) on the at least one cell, transmission of one or more uplink reference signals (e.g., aperiodic SRS or A-SRS) on a PSCell of the SCG, or a combination thereof.

At 720, the communications device (e.g., transmitter 354, transmitter 364, network interface 390, transmitter 314, transmitter 314, etc.) transmits the trigger to a network component to facilitate the aperiodic measurement procedure. In some designs where the communications device corresponds to the SN, the trigger may be transmitted to the UE or the MN at 720. In some designs where the communications device corresponds to the MN, the trigger may be transmitted to the UE or the SN at 720. In some designs where the communications device corresponds to the UE, the trigger may be transmitted to the MN or the SN at 720. In some designs, the trigger is transmitted before a dormancy deactivation message is received, while in other designs the trigger is transmitted in association with the dormancy deactivation message.

Referring to FIGS. 6-7, in some designs, the trigger to perform the aperiodic measurement procedure may be sent to the PSCell, which may in turn forward the trigger to any SCell(s) involved with the aperiodic measurement procedure.

Figure 8:
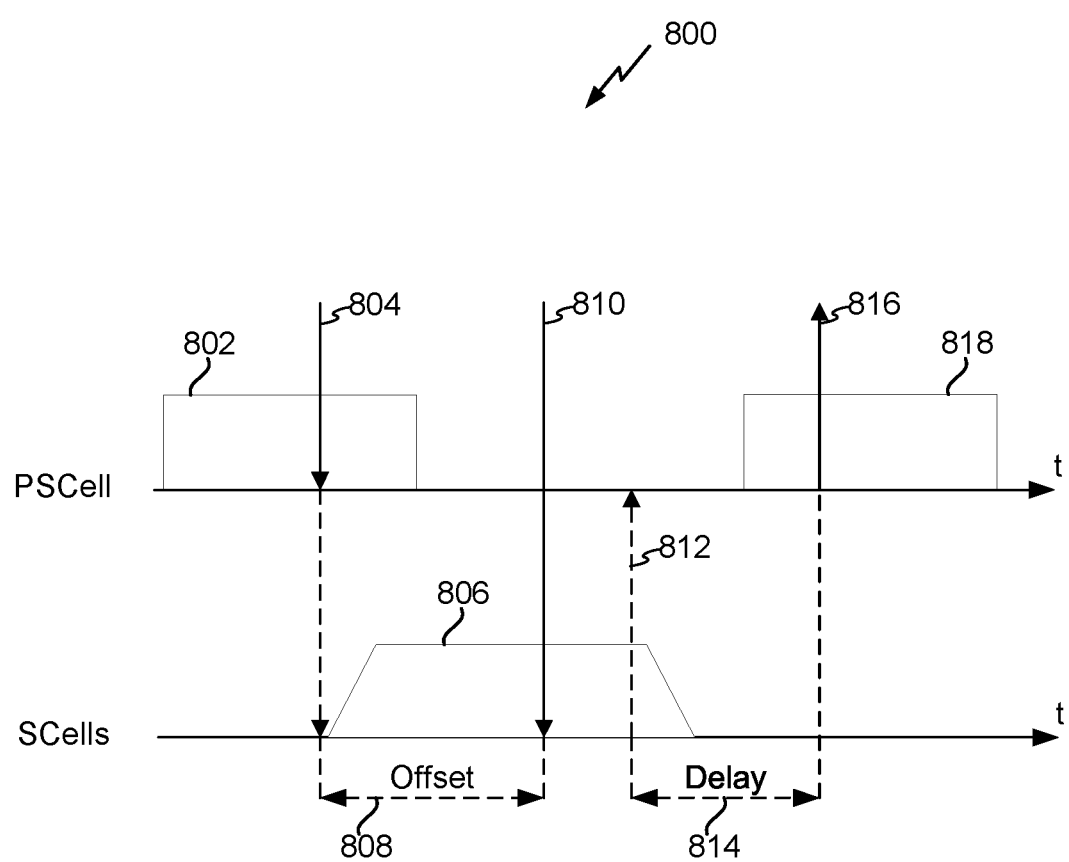
FIGS. 8 and 14 illustrate example trigger sequences for an aperiodic SCell measurement in accordance with an embodiment of the disclosure.

FIG. 8 illustrates an example trigger sequence 800 for an aperiodic SCell measurement in accordance with an embodiment of the disclosure. At 802, the SCG is in the dormant state, and the UE is monitoring a PSCell during a periodic DL monitoring window. At 804, a trigger (e.g., A-CSI-RS) is received from the PSCell that instructs the UE to perform an aperiodic measurement procedure, and a trigger is also sent to wake up an SCell (e.g., to transmit A-CSI-RS). The UE starts to monitor the PSCell and/or the SCell(s) during an aperiodic DL monitoring window 806 in response to the trigger at 804. After an offset 808 from the trigger, an A-CSI-RS is received on the PSCell and/or the SCell(s) at 810, which is received and measured by the UE. At 812, a measurement report for the PSCell and/or the SCell(s) is prepared and queued for transmission by the PSCell. After a delay period 814, the measurement report is transmitted at 816 during the next periodic DL monitoring window 818 of the PSCell.

Referring to FIG. 8, in some designs, the triggering offset at 808 may be offset from reception of trigger reception to the reception of measurement RS. In some designs, the triggering offset at 808 is required to ensure the SCell(s) are out of sleep state and ready to receive the measurement RS. In some designs, the triggering offset could be set to a value (or values) greater than a timing expected to bringing the SCell(s) out of sleep state. In some designs, the triggering offset may be sent via an A-CSI triggering configuration sent to the PSCell. In some designs, the UE may monitor DL reference signals on the PSCell and/or all SCells and may transmit measurement reports (or alternative, UL reference signals such as A-SRS) via PSCell using PUCCH or PUSCH only. In some designs, aperiodic measurements may be triggered by SN, MN, or UE. In some designs, aperiodic measurement reporting may be triggered by UE, MN or SN. For example, a timing of transmission or reception of the aperiodic reference signal, at one or more secondary cells (SCells) of the SCG and/or a primary secondary cell (PS-Cell) is based on an offset from the reception of the respective trigger.

Figure 9:
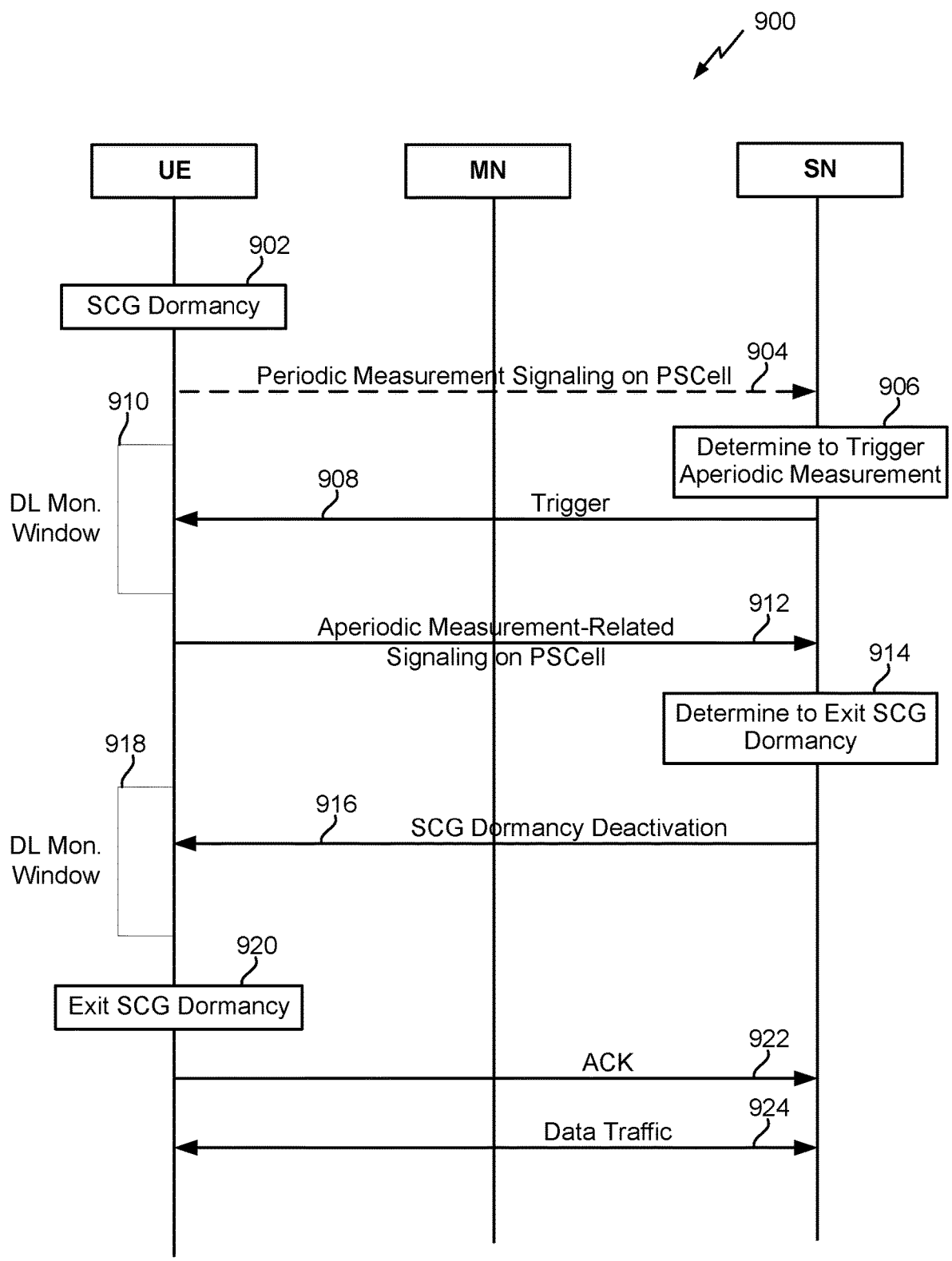
FIGS. 9-13 and 15-21 illustrate example implementations of the processes of FIGS. 6-7 in accordance with aspects of the disclosure.

FIG. 9 illustrates an example implementation 900 of the processes 600-700 of FIGS. 6-7 in accordance with aspects of the disclosure. In particular, FIG. 9 depicts an example where the SN triggers an aperiodic measurement associated with the PSCell and/or SCell(s) of a dormant SCG.

Referring to FIG. 9, at 902, an SCG associated with a UE is in a dormant state. During the SCG dormancy, at 904, the UE optionally transmits periodic measurement signaling (e.g., transmission of P-SRS, measurement reporting of P-CSI-RS, etc.) to the SN on the PSCell. At 906, the SN determines to trigger an aperiodic measurement procedure on the PSCell and/or one or more SCell(s) of the dormant SCG. At 908, the SN transmits a trigger to the UE over the PSCell, which is received by the UE on the PSCell during a periodic DL monitoring window 910. At 912, the UE transmits aperiodic measurement-related signaling (e.g., transmission of A-SRS, L1 measurement reporting of A-CSI-RS(s) on PSCell and/or SCell(s), etc.) associated with the PSCell and/or the SCell(s) over the PSCell. At 914, the SN determines to exit SCG dormancy. At 916, the SN transmits an SCG dormancy deactivation message to the UE over the PSCell, which is received by the UE on the PSCell during a periodic DL monitoring window 918. At 920, the SCG exits dormancy. At 922, the UE transmits an Out-of Dormancy acknowledgment (ACK) to the SN. At 924, the UE exchanges data traffic over the PSCell and SCells of the SCG.

Figure 10:
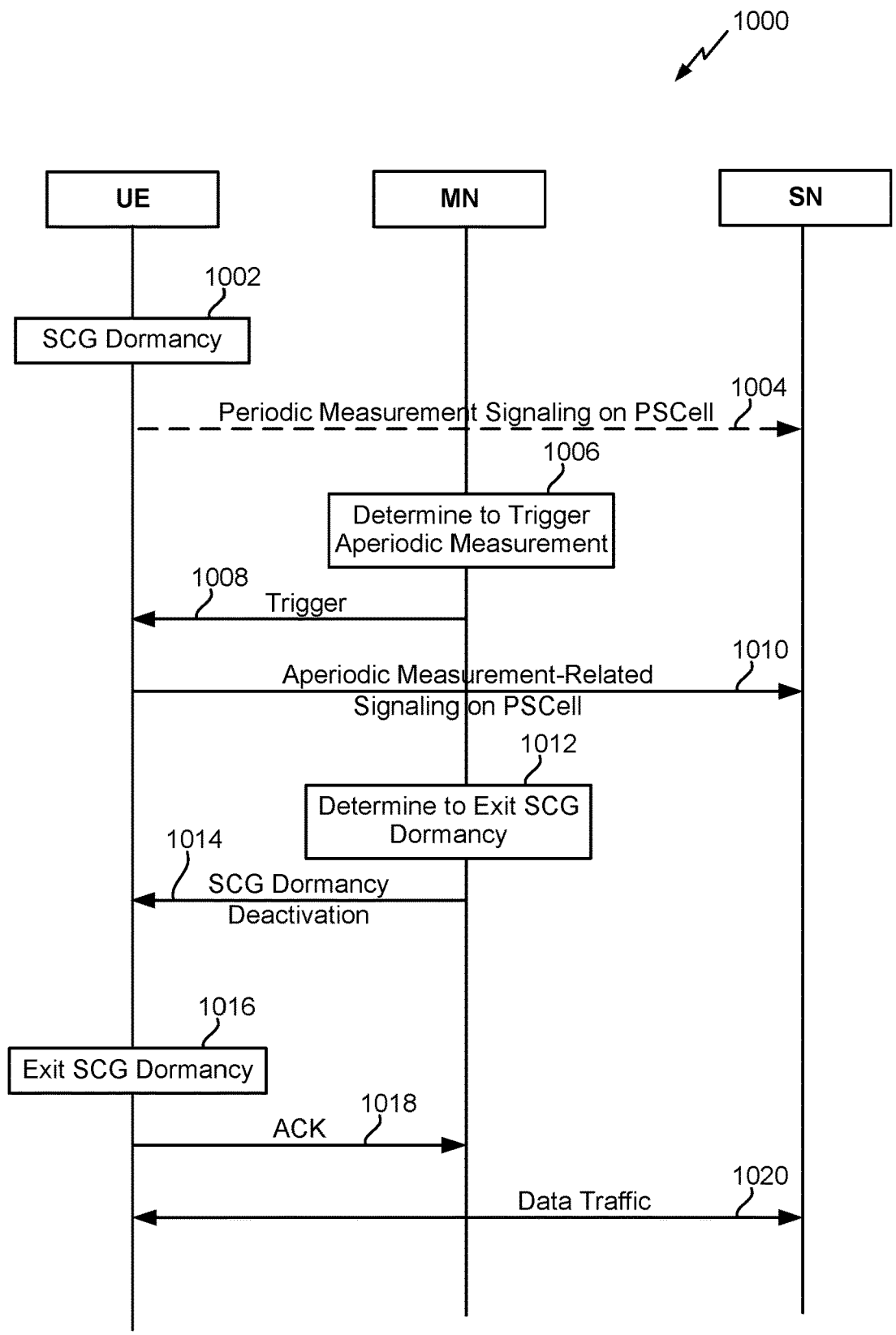

FIG. 10 illustrates an example implementation 1000 of the processes 600-700 of FIGS. 6-7 in accordance with aspects of the disclosure. In particular, FIG. 10 depicts an example where the MN triggers an aperiodic measurement associated with the PSCell and/or SCell(s) of a dormant SCG.

Referring to FIG. 10, at 1002, an SCG associated with a UE is in a dormant state. During the SCG dormancy, at 1004, the UE optionally transmits periodic measurement signaling (e.g., transmission of P-SRS, measurement reporting of P-CSI-RS, etc.) to the SN on the PSCell. At 1006, the SN determines to trigger an aperiodic measurement procedure on one or more SCell(s) of the dormant SCG. At 1008, the MN transmits a trigger to the UE over the MCG (which is not dormant). At 1010, the UE transmits aperiodic measurement-related signaling (e.g., transmission of A-SRS, L1 measurement reporting of A-CSI-RS(s) on PSCell and/or SCell(s), etc.) associated with the SCell(s) over the PSCell. At 1012, the MN determines to exit SCG dormancy. At 1014, the MN transmits an SCG dormancy deactivation message to the UE over the MCG (which is not dormant). At 1016, the SCG exits dormancy. At 1018, the UE transmits an Out-of Dormancy acknowledgment (ACK) to the SN. At 1020, the UE exchanges data traffic over the PSCell and SCells of the SCG.

Figure 11:
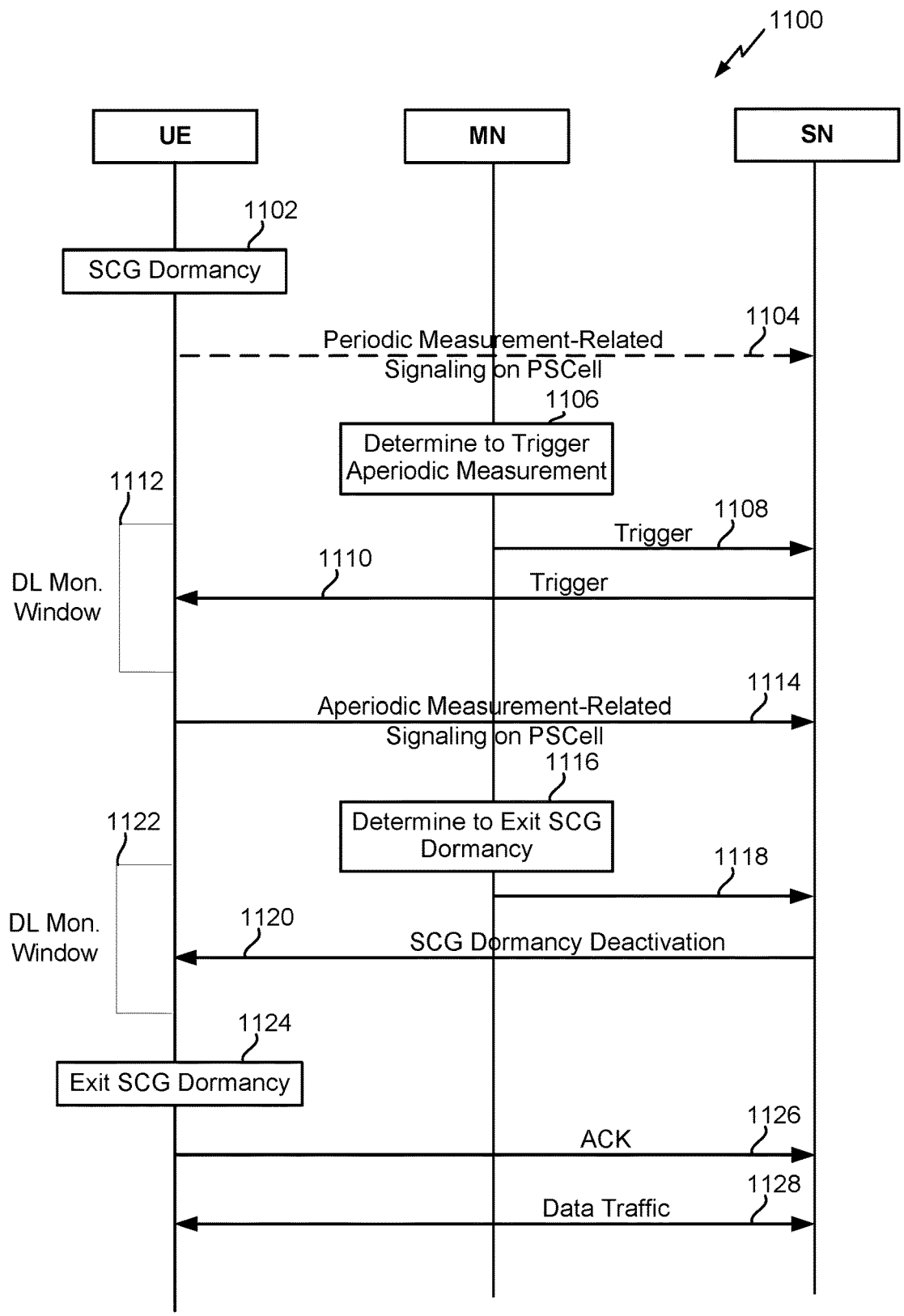

FIG. 11 illustrates an example implementation 1100 of the processes 600-700 of FIGS. 6-7 in accordance with aspects of the disclosure. Similar to FIG. 10, FIG. 11 depicts another example where the MN triggers an aperiodic measurement associated with the PSCell and/or SCell(s) of a dormant SCG. However, in FIG. 10, the MN uses the SN as a proxy for routing the associated messaging for triggering the aperiodic measurement.

Referring to FIG. 11, at 1102, an SCG associated with a UE is in a dormant state. During the SCG dormancy, at 1104, the UE optionally transmits periodic measurement signaling (e.g., transmission of P-SRS, measurement reporting of P-CSI-RS, etc.) to the SN on the PSCell. At 1106, the MN determines to trigger an aperiodic measurement procedure on the PSCell and/or one or more SCell(s) of the dormant SCG. At 1108, the MN forwards a trigger to the SN (via backhaul signaling). At 1110, the SN relays the MN-originated trigger to the UE over the PSCell, which is received by the UE on the PSCell during a periodic DL monitoring window 1112. At 1114, the UE transmits aperiodic measurement-related signaling (e.g., transmission of A-SRS, L1 measurement reporting of A-CSI-RS(s) on PSCell and/or SCell(s), etc.) associated with the PSCell and/or the SCell(s) over the PSCell. At 1116, the MN determines to exit SCG dormancy. At 1118, the MN forwards an SCG dormancy deactivation message to the SN (via backhaul signaling). At 1120, the SN transmits the MN-originated SCG dormancy deactivation message to the UE over the PSCell, which is received by the UE on the PSCell during a periodic DL monitoring window 1122. At 1124, the SCG exits dormancy. At 1126, the UE transmits an Out-of Dormancy acknowledgment (ACK) to the SN. At 1128, the UE exchanges data traffic over the PSCell and SCells of the SCG.

Figure 12:
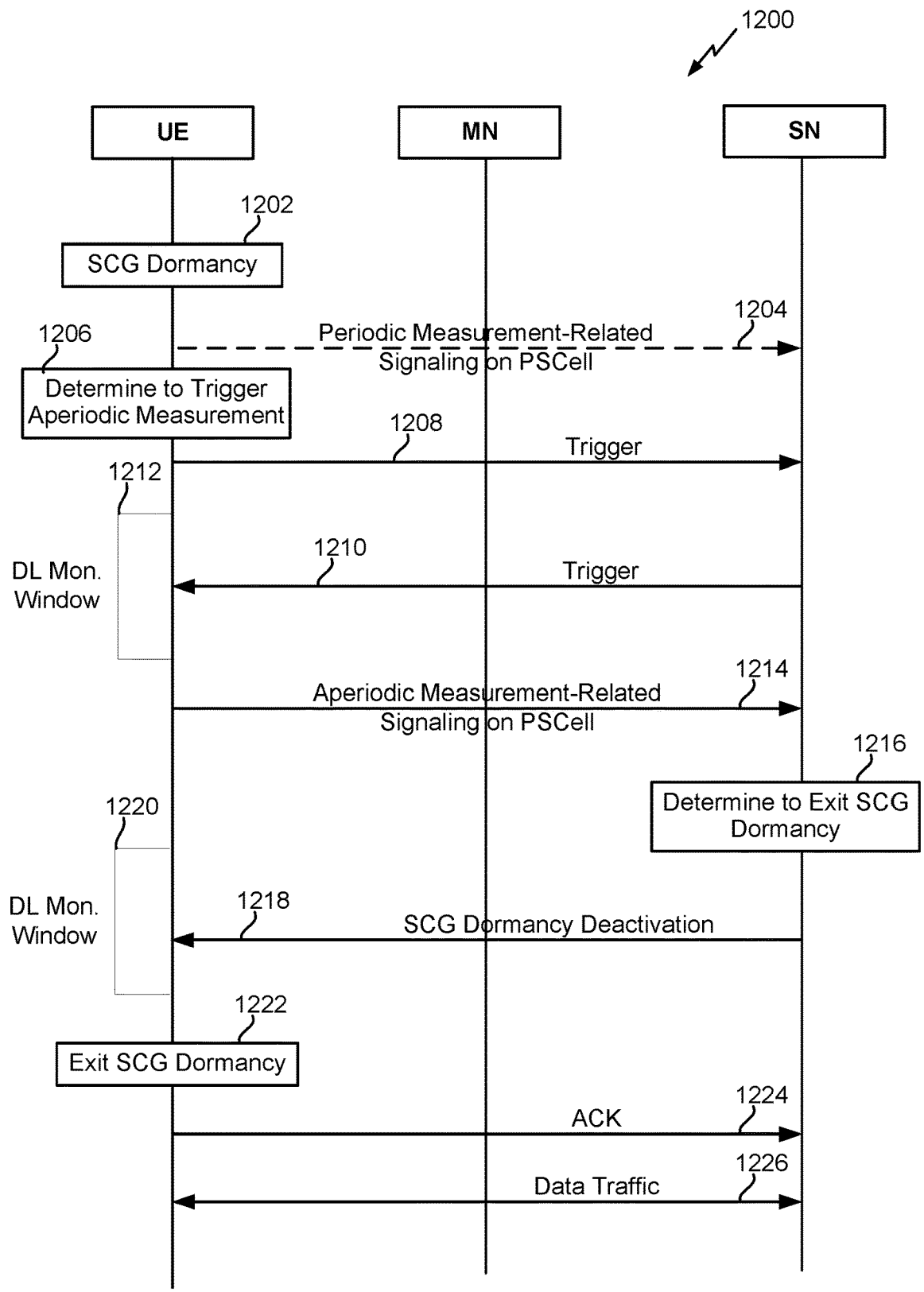

FIG. 12 illustrates an example implementation 1200 of the processes 600-700 of FIGS. 6-7 in accordance with aspects of the disclosure. Similar to FIG. 11, FIG. 12 depicts another example where the SN is used a proxy for routing the associated messaging for triggering the aperiodic measurement. However, in FIG. 12, the UE is the entity which triggers the aperiodic measurement associated with the PSCell and/or SCell(s) of a dormant SCG.

Referring to FIG. 12, at 1202, an SCG associated with a UE is in a dormant state. During the SCG dormancy, at 1204, the UE optionally transmits periodic measurement signaling (e.g., transmission of P-SRS, measurement reporting of P-CSI-RS, etc.) to the SN on the PSCell. At 1206, the UE determines to trigger an aperiodic measurement procedure on the PSCell and/or one or more SCell(s) of the dormant SCG. At 1208, the UE transmits a trigger to the SN (via PSCell). At 1210, the SN relays the UE-originated trigger back to the UE over the PSCell, which is received by the UE on the PSCell during a periodic DL monitoring window 1212. At 1214, the UE transmits aperiodic measurement-related signaling (e.g., transmission of A-SRS, L1 measurement reporting of A-CSI-RS(s) on PSCell and/or SCell(s), etc.) associated with the PSCell and/or the SCell(s) over the PSCell. At 1216, the SN determines to exit SCG dormancy. At 1218, the SN transmits an SCG dormancy deactivation message to the UE over the PSCell, which is received by the UE on the PSCell during a periodic DL monitoring window 1220. At 1222, the SCG exits dormancy. At 1224, the UE transmits an Out-of Dormancy acknowledgment (ACK) to the SN. At 1226, the UE exchanges data traffic over the PSCell and SCells of the SCG.

Figure 13:
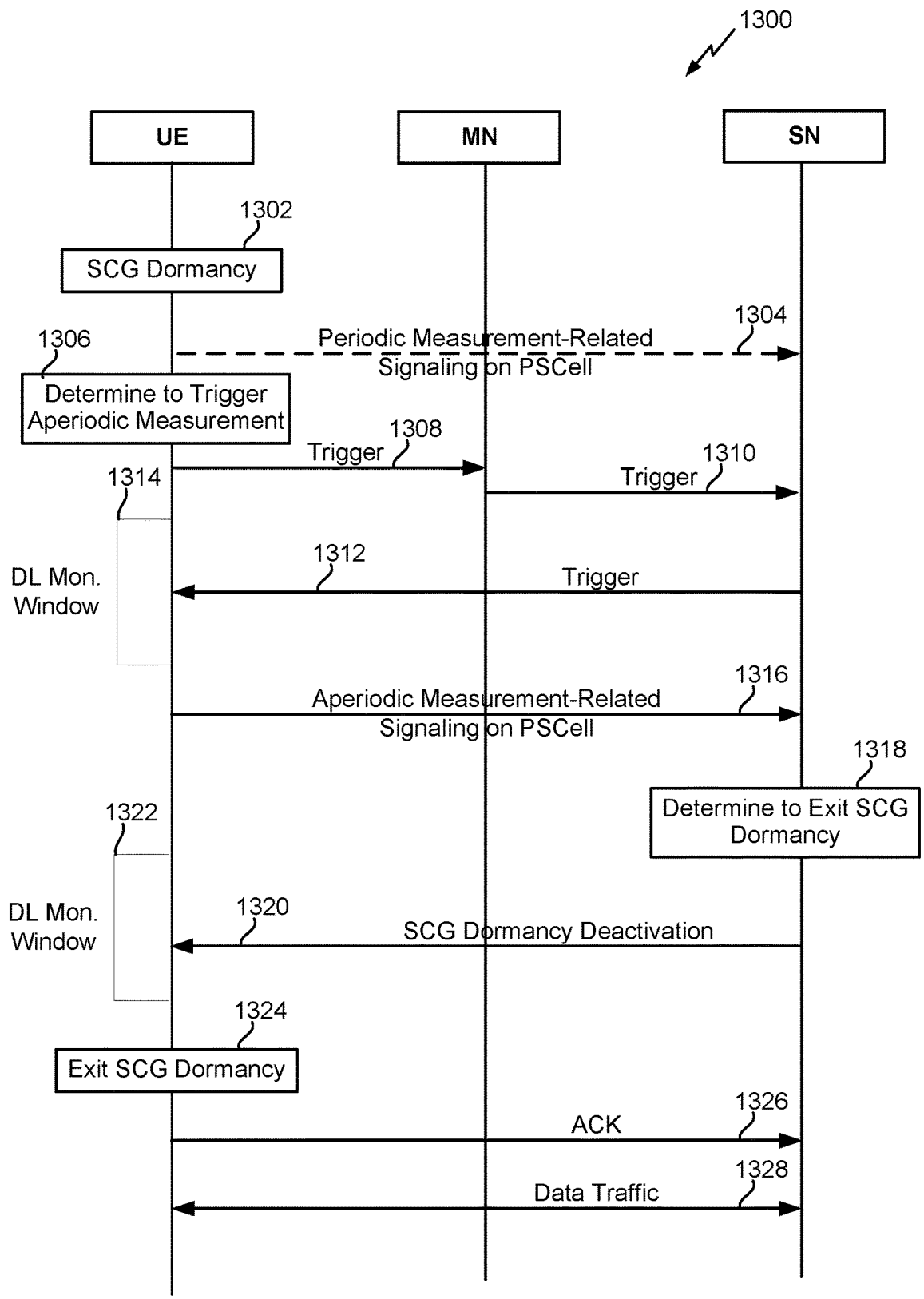

FIG. 13 illustrates an example implementation 1300 of the processes 600-700 of FIGS. 6-7 in accordance with aspects of the disclosure. Similar to FIG. 12, FIG. 13 depicts another example where the UE triggers an aperiodic measurement associated with the PSCell and/or SCell(s) of a dormant SCG. However, in FIG. 13, the UE uses the MN as a proxy for routing the associated messaging for triggering the aperiodic measurement.

Referring to FIG. 13, at 1302, an SCG associated with a UE is in a dormant state. During the SCG dormancy, at 1304, the UE optionally transmits periodic measurement signaling (e.g., transmission of P-SRS, measurement reporting of P-CSI-RS, etc.) to the SN on the PSCell. At 1306, the UE determines to trigger an aperiodic measurement procedure on the PSCell and/or one or more SCell(s) of the dormant SCG. At 1308, the UE transmits a trigger to the MN (via MCG). At 1310, the MN relays the UE-originated trigger to the SN (via backhaul signaling). At 1312, the SN in turn relays the UE-originated trigger back to the UE over the PSCell, which is received by the UE on the PSCell during a periodic DL monitoring window 1314. At 1316, the UE transmits aperiodic measurement-related signaling (e.g., transmission of A-SRS, L1 measurement reporting of A-CSI-RS(s) on PSCell and/or SCell(s), etc.) associated with the PSCell and/or the SCell(s) over the PSCell. At 1318, the SN determines to exit SCG dormancy. At 1320, the SN transmits an SCG dormancy deactivation message to the UE over the PSCell, which is received by the UE on the PSCell during a periodic DL monitoring window 1322. At 1324, the SCG exits dormancy. At 1326, the UE transmits an Out-of Dormancy acknowledgment (ACK) to the SN. At 1328, the UE exchanges data traffic over the PSCell and SCells of the SCG.

Figure 14:
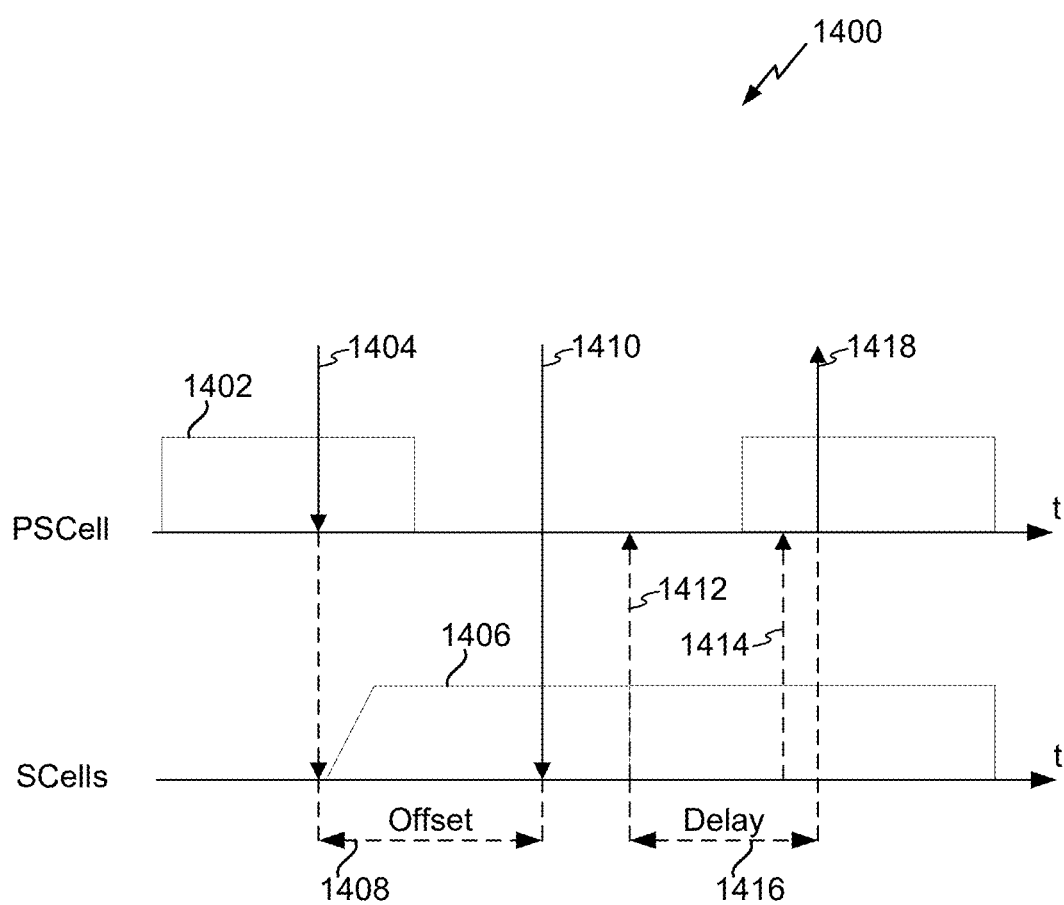

FIG. 14 illustrates an example trigger sequence 1400 for an aperiodic SCell measurement in accordance with an embodiment of the disclosure. FIG. 14 is similar in some respects to FIG. 8, except that in FIG. 14 the measurement RS (e.g., A-CSI-RS) is received at the UE during SCG dormancy whereas the measurement report itself is transmitted after SCG dormancy is deactivated.

At 1402, the SCG is in the dormant state, and the UE is monitoring a PSCell during a periodic DL monitoring window. At 1404, a trigger (e.g., A-CSI-RS) is received over the PSCell that instructs the UE to perform an aperiodic measurement procedure, and a trigger is also sent to wake up an SCell (e.g., to transmit A-CSI-RS). The UE starts to monitor the PSCell and/or the SCell(s) during an aperiodic DL monitoring window 1406 in response to the trigger at 1404. After an offset 1408 from the trigger, an A-CSI-RS is received on the PSCell and/or the SCell(s) at 1410, which is received and measured by the UE. At 1412, a measurement report for the PSCell and/or the SCell(s) is prepared and queued for transmission by the PSCell. At 1414, the SCG transitions out of dormancy. After a delay period 1416, the measurement report is transmitted at 1418 along with an Out-of-dormancy ACK. For example, a timing of transmission or reception of the aperiodic reference signal, at one or more secondary cells (SCells) of the SCG and/or a primary secondary cell (PSCell) is based on an offset from the reception of the respective trigger.

Figure 15:
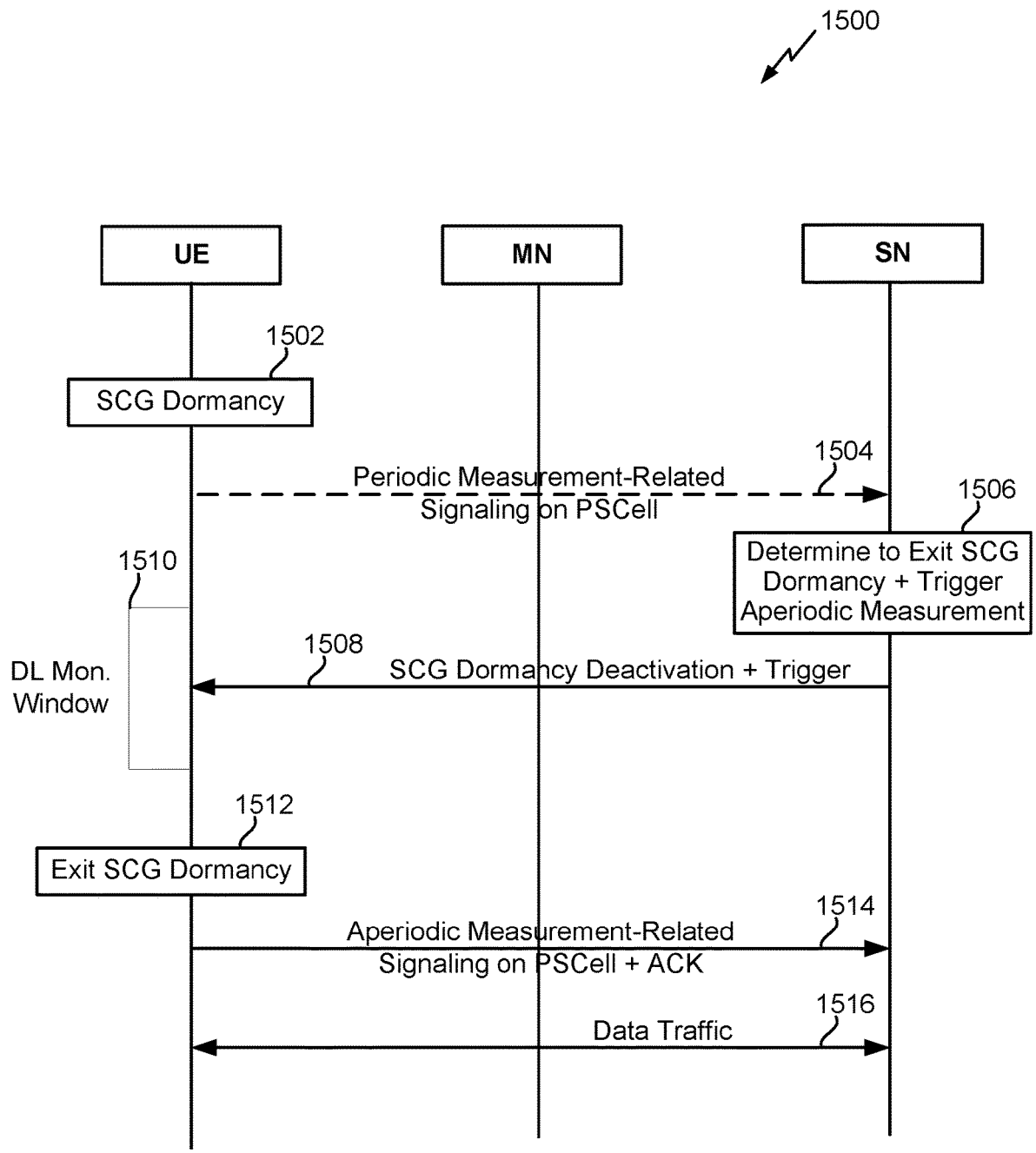

FIG. 15 illustrates an example implementation 1500 of the processes 600-700 of FIGS. 6-7 in accordance with aspects of the disclosure. In particular, FIG. 15 depicts an example where the SN triggers an aperiodic measurement associated with the PSCell and/or SCell(s) of a dormant SCG. The process of FIG. 15 is similar to FIG. 9, except that the aperiodic measurement-related signaling is transmitted by the UE after SCG dormancy has been deactivated.

Referring to FIG. 15, at 1502, an SCG associated with a UE is in a dormant state. During the SCG dormancy, at 1504, the UE optionally transmits periodic measurement signaling (e.g., transmission of P-SRS, measurement reporting of P-CSI-RS, etc.) to the SN on the PSCell. At 1506, the SN determines to (i) trigger an aperiodic measurement procedure on the PSCell and/or one or more SCell(s) of the dormant SCG, and (ii) to exit SCG dormancy. At 1508, the SN transmits, to the UE over the PSCell, a trigger to both (i) perform the aperiodic measurement procedure and to (ii) exit SCG dormancy, which is received by the UE on the PSCell during a periodic DL monitoring window 1510. At 1512, the SCG exits dormancy. At 1514, the UE transmits (i) aperiodic measurement-related signaling (e.g., transmission of A-SRS, L1 measurement reporting of A-CSI-RS(s) on PSCell and/or SCell(s), etc.) associated with the PSCell and/or the SCell(s) over the PSCell and (ii) an Out-of Dormancy acknowledgment (ACK) to the SN. At 1516, the UE exchanges data traffic over the PSCell and SCells of the SCG.

Figure 16:
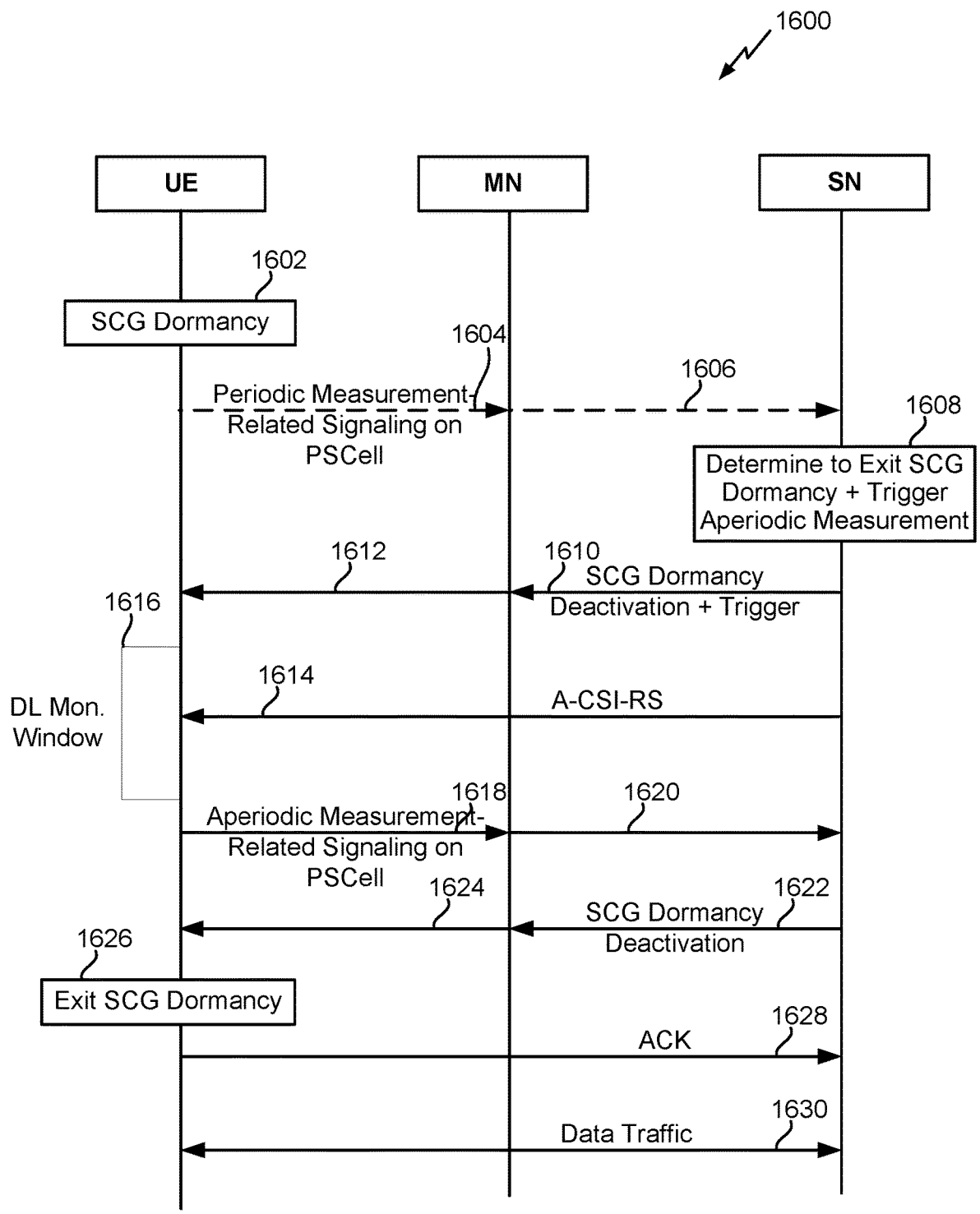

FIG. 16 illustrates an example implementation 1600 of the processes 600-700 of FIGS. 6-7 in accordance with aspects of the disclosure. In particular, FIG. 16 depicts an example where the SN triggers an aperiodic measurement associated with the PSCell and/or SCell(s) of a dormant SCG. The process of FIG. 16 is similar to FIG. 15, except that the MN functions as a proxy for the aperiodic measurement signaling.

Referring to FIG. 16, at 1602, an SCG associated with a UE is in a dormant state. During the SCG dormancy, at 1604, the UE optionally transmits periodic measurement signaling (e.g., transmission of P-SRS, measurement reporting of P-CSI-RS, etc.) to the MN, which in turn optionally forwards the periodic measurement signaling to the SN (via backhaul signaling) at 1606. At 1608, the SN determines to (i) trigger an aperiodic measurement procedure (e.g., A-CSI-RS measurement/reporting) on the PSCell and/or one or more SCell(s) of the dormant SCG, and (ii) to exit SCG dormancy. At 1610, the SN transmits, to the MN via backhaul signaling, a trigger to the UE to perform the aperiodic measurement procedure (e.g., A-CSI-RS measurement/reporting), which is relayed by the MN to the UE at 1612 (via MCG). At 1614, the SN transmits an A-CSI-RS to the UE, which is received and measured by the UE during a periodic downlink monitoring window 1616. At 1618, the UE transmits aperiodic measurement-related signaling (e.g., A-CSI-RS measurement/reporting) associated with the PSCell and/or the SCell(s) to the MN, which in turn forwards the aperiodic measurement-related signaling to the SN via backhaul signaling at 1620. At 1622, the SN transmits, to the MN via backhaul signaling, an SCG dormancy deactivation message, which in turn relays the SCG dormancy deactivation message to the UE (via MCG) at 1624. At 1626, the SCG exits dormancy. At 1628, the UE transmits an Out-of Dormancy acknowledgment (ACK) to the SN. At 1630, the UE exchanges data traffic over the PSCell and SCells of the SCG.

Figure 17:
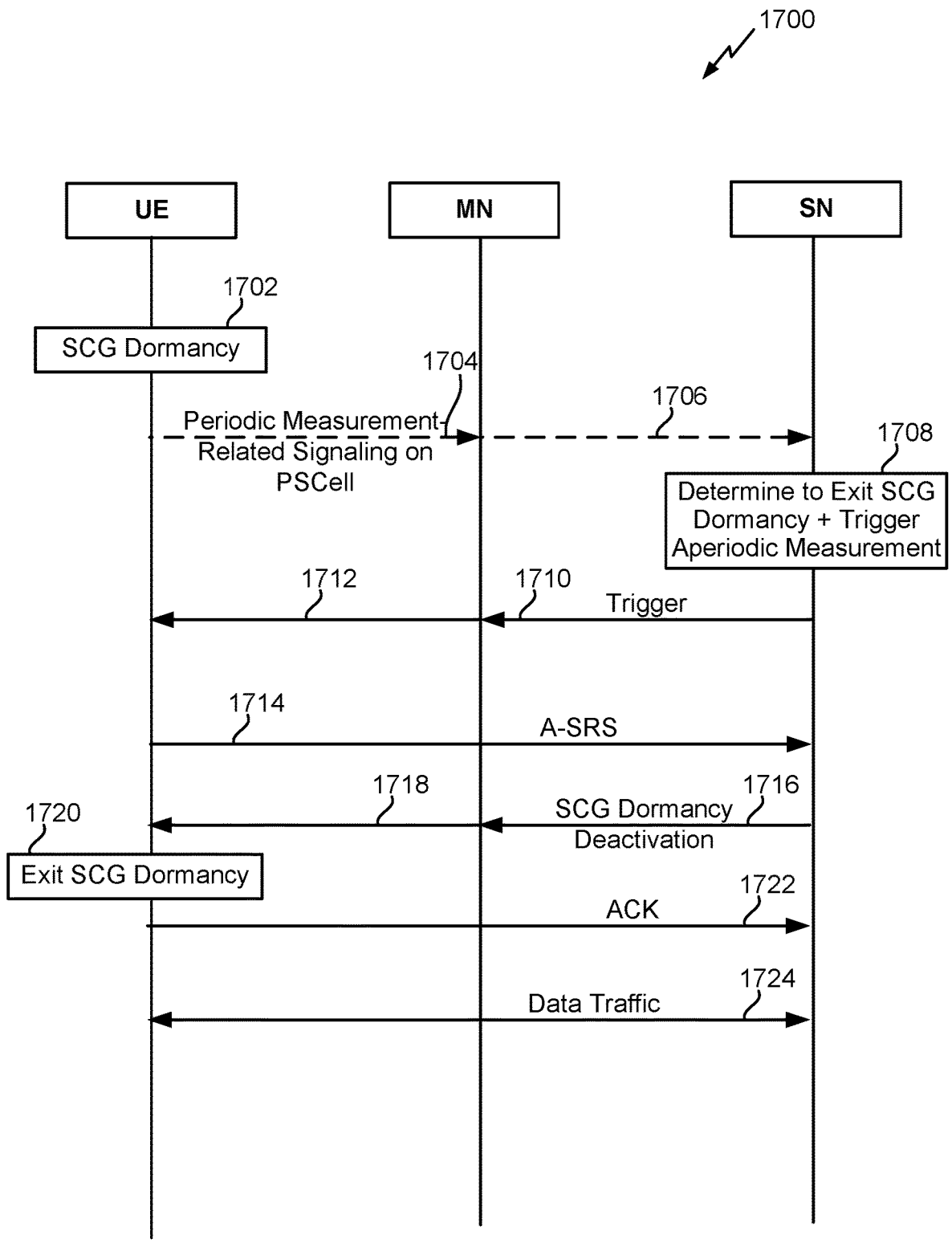

FIG. 17 illustrates an example implementation 1700 of the processes 600-700 of FIGS. 6-7 in accordance with aspects of the disclosure. In particular, FIG. 17 depicts an example where the SN triggers an aperiodic measurement associated with the PSCell of a dormant SCG. The process of FIG. 16 is similar to FIG. 17, except that the aperiodic measurement signaling comprises an uplink A-SRS rather than measurement/reporting of a downlink A-CSI-RS.

Referring to FIG. 17, at 1702, an SCG associated with a UE is in a dormant state. During the SCG dormancy, at 1704, the UE optionally transmits periodic measurement signaling (e.g., transmission of P-SRS, measurement reporting of P-CSI-RS, etc.) to the MN, which in turn optionally forwards the periodic measurement signaling to the SN (via backhaul signaling) at 1706. At 1708, the SN determines to (i) trigger an aperiodic measurement procedure (e.g., A-SRS transmission) on the PSCell of the dormant SCG, and (ii) to exit SCG dormancy. At 1710, the SN transmits, to the MN via backhaul signaling, a trigger to the UE to perform the aperiodic measurement procedure (e.g., A-SRS transmission), which is relayed by the MN to the UE at 1712 (via MCG). At 1714, the SN transmits an A-SRS on the PSCell. At 1716, the SN transmits, to the MN via backhaul signaling, an SCG dormancy deactivation message, which in turn relays the SCG dormancy deactivation message to the UE (via MCG) at 1718. At 1720, the SCG exits dormancy. At 1722, the UE transmits an Out-of Dormancy acknowledgment (ACK) to the SN. At 1724, the UE exchanges data traffic over the PSCell and SCells of the SCG.

Figure 18:
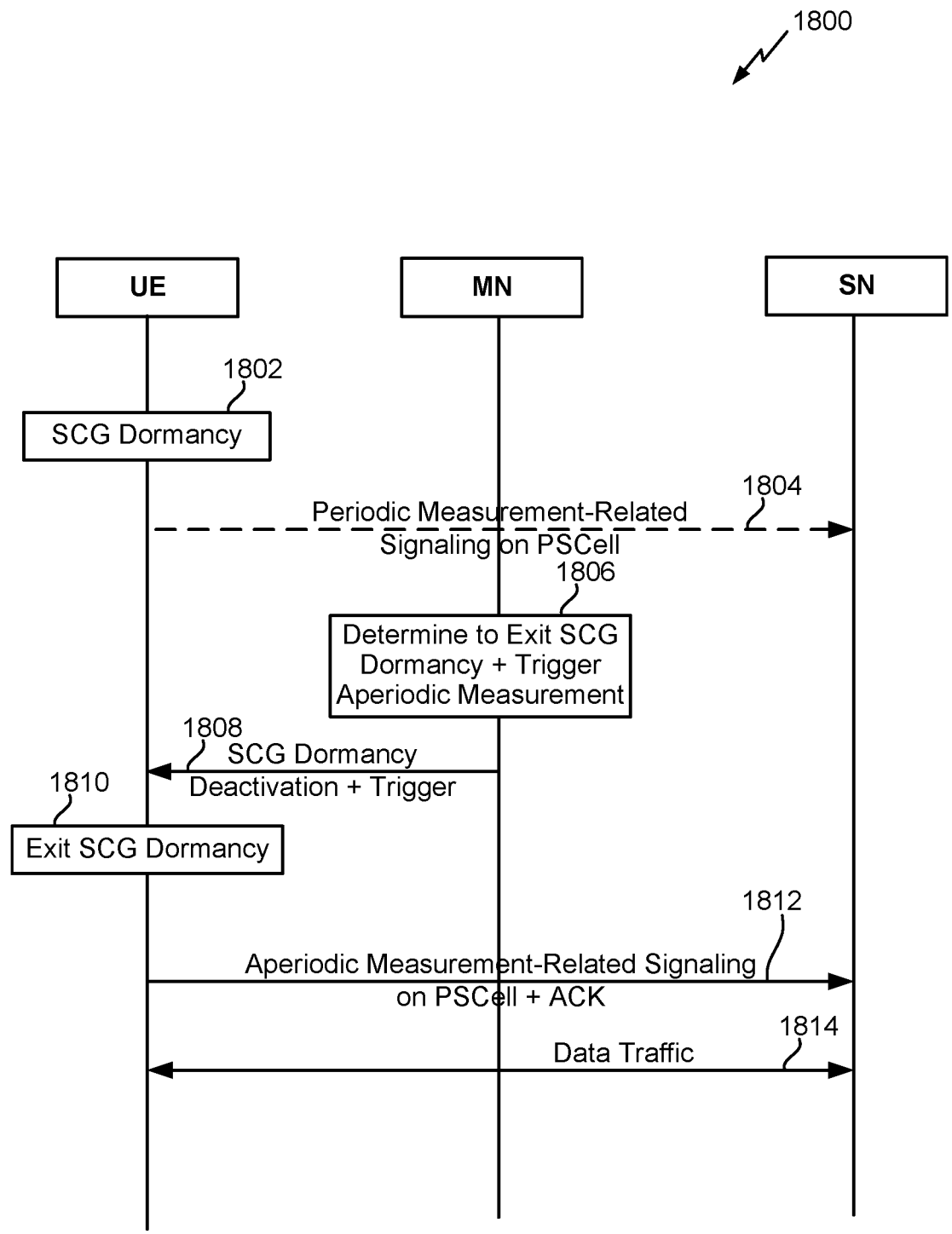

FIG. 18 illustrates an example implementation 1800 of the processes 600-700 of FIGS. 6-7 in accordance with aspects of the disclosure. In particular, FIG. 18 depicts an example where the MN triggers an aperiodic measurement associated with the PSCell and/or SCell(s) of a dormant SCG in association with deactivation of the SCG dormancy.

Referring to FIG. 18, at 1802, an SCG associated with a UE is in a dormant state. During the SCG dormancy, at 1804, the UE optionally transmits periodic measurement signaling (e.g., transmission of P-SRS, measurement reporting of P-CSI-RS, etc.) to the SN via the PSCell. At 1806, the MN determines to (i) trigger an aperiodic measurement procedure (e.g., transmission of A-SRS, L1 measurement reporting of A-CSI-RS(s) on PSCell and/or SCell(s), etc.) on the PSCell and/or one or more SCell(s) of the dormant SCG, and (ii) to exit SCG dormancy. At 1808, the MN transmits, to the UE via MCG, a trigger (i) to perform the aperiodic measurement procedure (e.g., transmission of A-SRS, L1 measurement reporting of A-CSI-RS(s) on PSCell and/or SCell(s), etc.) and (ii) to deactivate SCG dormancy. At 1810, the SCG exits dormancy. At 1812, the UE transmits (i) aperiodic measurement-related signaling (e.g., transmission of A-SRS, L1 measurement reporting of A-CSI-RS(s) on PSCell and/or SCell(s), etc.) associated with the PSCell and/or the SCell(s) over the PSCell and (ii) an Out-of Dormancy acknowledgment (ACK) to the SN. At 1814, the UE exchanges data traffic over the PSCell and SCells of the SCG.

Figure 19:
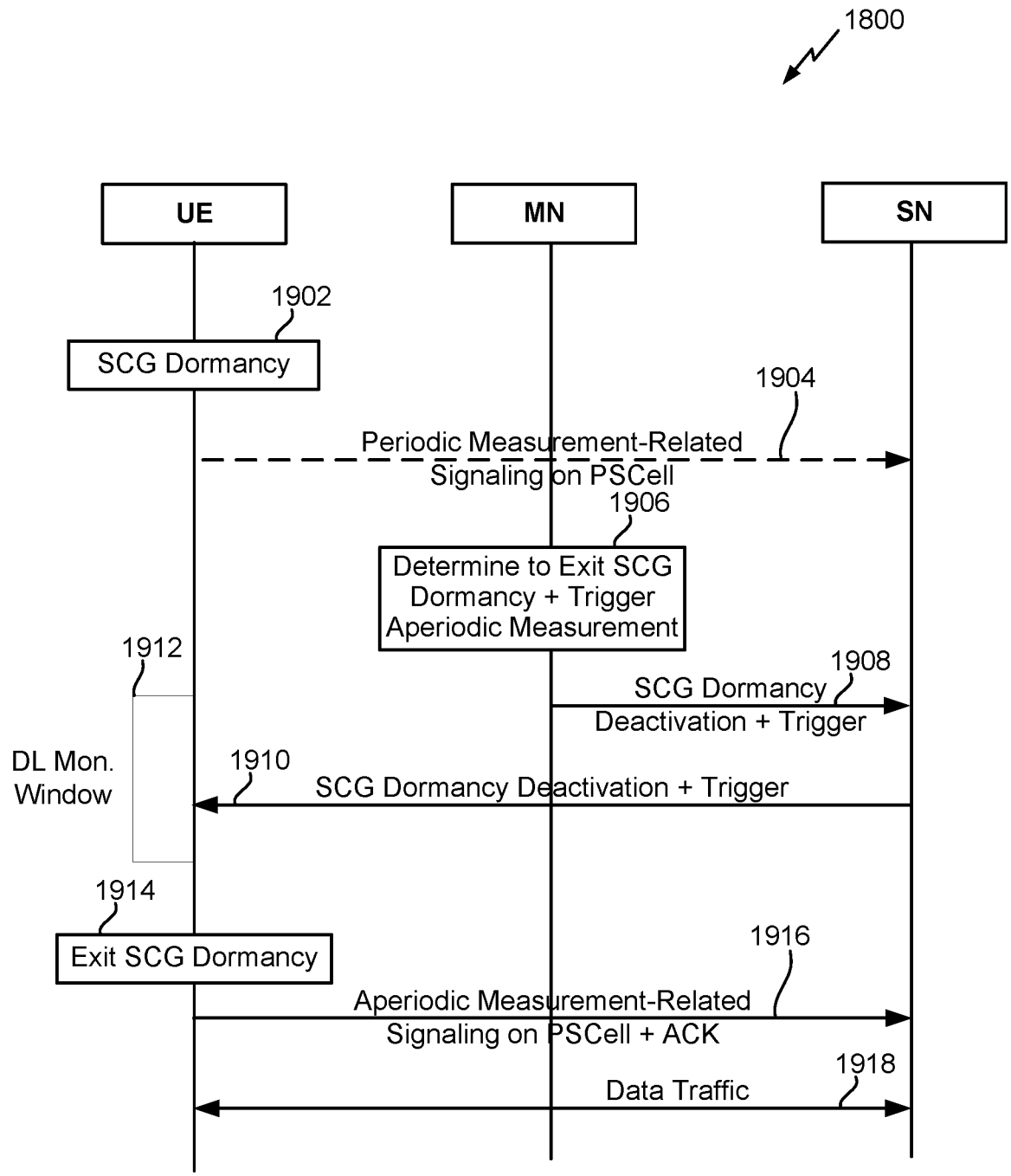

FIG. 19 illustrates an example implementation 1900 of the processes 600-700 of FIGS. 6-7 in accordance with aspects of the disclosure. In particular, FIG. 19 depicts an example where the MN triggers an aperiodic measurement associated with the PSCell and/or SCell(s) of a dormant SCG in association with deactivation of the SCG dormancy and using the SN as a proxy.

Figure 20:
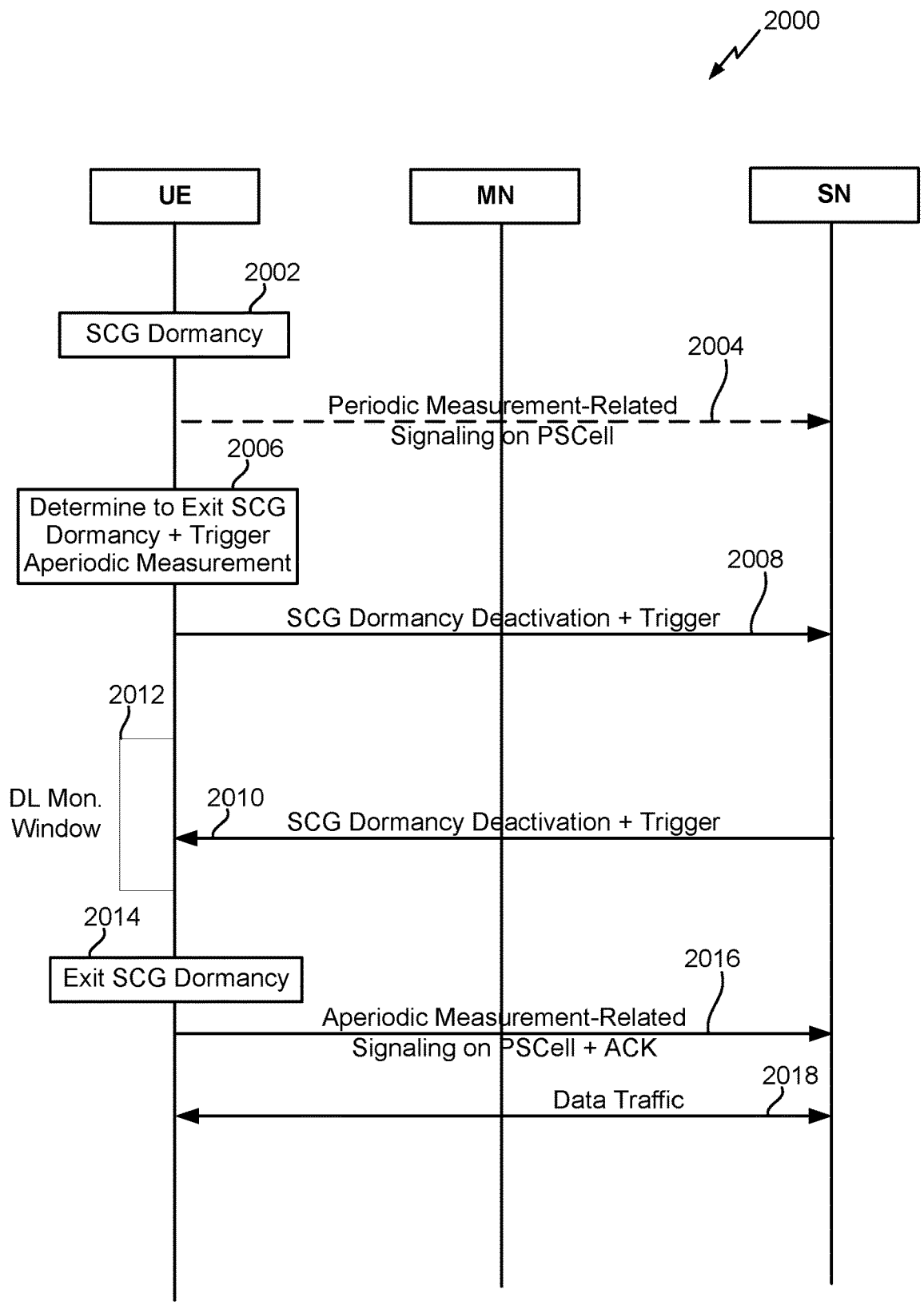

Referring to FIG. 20, at 1902, an SCG associated with a UE is in a dormant state. During the SCG dormancy, at 1904, the UE optionally transmits periodic measurement signaling (e.g., transmission of P-SRS, measurement reporting of P-CSI-RS, etc.) to the SN via the PSCell. At 1906, the MN determines to (i) trigger an aperiodic measurement procedure (e.g., transmission of A-SRS, L1 measurement reporting of A-CSI-RS(s) on PSCell and/or SCell(s), etc.) on the PSCell and/or one or more SCell(s) of the dormant SCG, and (ii) to exit SCG dormancy. At 1908, the MN transmits, to the SN via backhaul signaling, a trigger for the UE to (i) perform the aperiodic measurement procedure (e.g., transmission of A-SRS, L1 measurement reporting of A-CSI-RS(s) on PSCell and/or SCell(s), etc.) and to (ii) deactivate SCG dormancy. At 1910, the SN in turn forwards the trigger to the UE via the PSCell, which is received by the UE on the PSCell during a periodic DL monitoring window 1912. At 1914, the SCG exits dormancy. At 1916, the UE transmits (i) aperiodic measurement-related signaling (e.g., transmission of A-SRS, L1 measurement reporting of A-CSI-RS(s) on PSCell and/or SCell(s), etc.) associated with the PSCell and/or the SCell(s) over the PSCell and (ii) an Out-of Dormancy acknowledgment (ACK) to the SN. At 1918, the UE exchanges data traffic over the PSCell and SCells of the SCG.

FIG. 20 illustrates an example implementation 2000 of the processes 600-700 of FIGS. 6-7 in accordance with aspects of the disclosure. In particular, FIG. 20 depicts an example where the UE triggers an aperiodic measurement associated with the PSCell and/or SCell(s) of a dormant SCG in association with deactivation of the SCG dormancy.

Referring to FIG. 20, at 2002, an SCG associated with a UE is in a dormant state. During the SCG dormancy, at 2004, the UE optionally transmits periodic measurement signaling (e.g., transmission of P-SRS, measurement reporting of P-CSI-RS, etc.) to the SN via the PSCell. At 2006, the UE determines to (i) trigger an aperiodic measurement procedure (e.g., transmission of A-SRS, L1 measurement reporting of A-CSI-RS(s) on PSCell and/or SCell(s), etc.) on the PSCell and/or one or more SCell(s) of the dormant SCG, and (ii) to exit SCG dormancy. At 2008, the UE transmits, to the SN via PSCell, a trigger for the UE to (i) perform the aperiodic measurement procedure (e.g., transmission of A-SRS, L1 measurement reporting of A-CSI-RS(s) on PSCell and/or SCell(s), etc.) and to (ii) deactivate SCG dormancy. At 2010, the SN in turn forwards the trigger back to the UE via the PSCell, which is received by the UE on the PSCell during a periodic DL monitoring window 2012. At 2014, the SCG exits dormancy. At 2016, the UE transmits (i) aperiodic measurement-related signaling (e.g., transmission of A-SRS, L1 measurement reporting of A-CSI-RS(s) on PSCell and/or SCell(s), etc.) associated with the PSCell and/or the SCell(s) over the PSCell and (ii) an Out-of Dormancy acknowledgment (ACK) to the SN. At 2018, the UE exchanges data traffic over the PSCell and SCells of the SCG.

Figure 21:
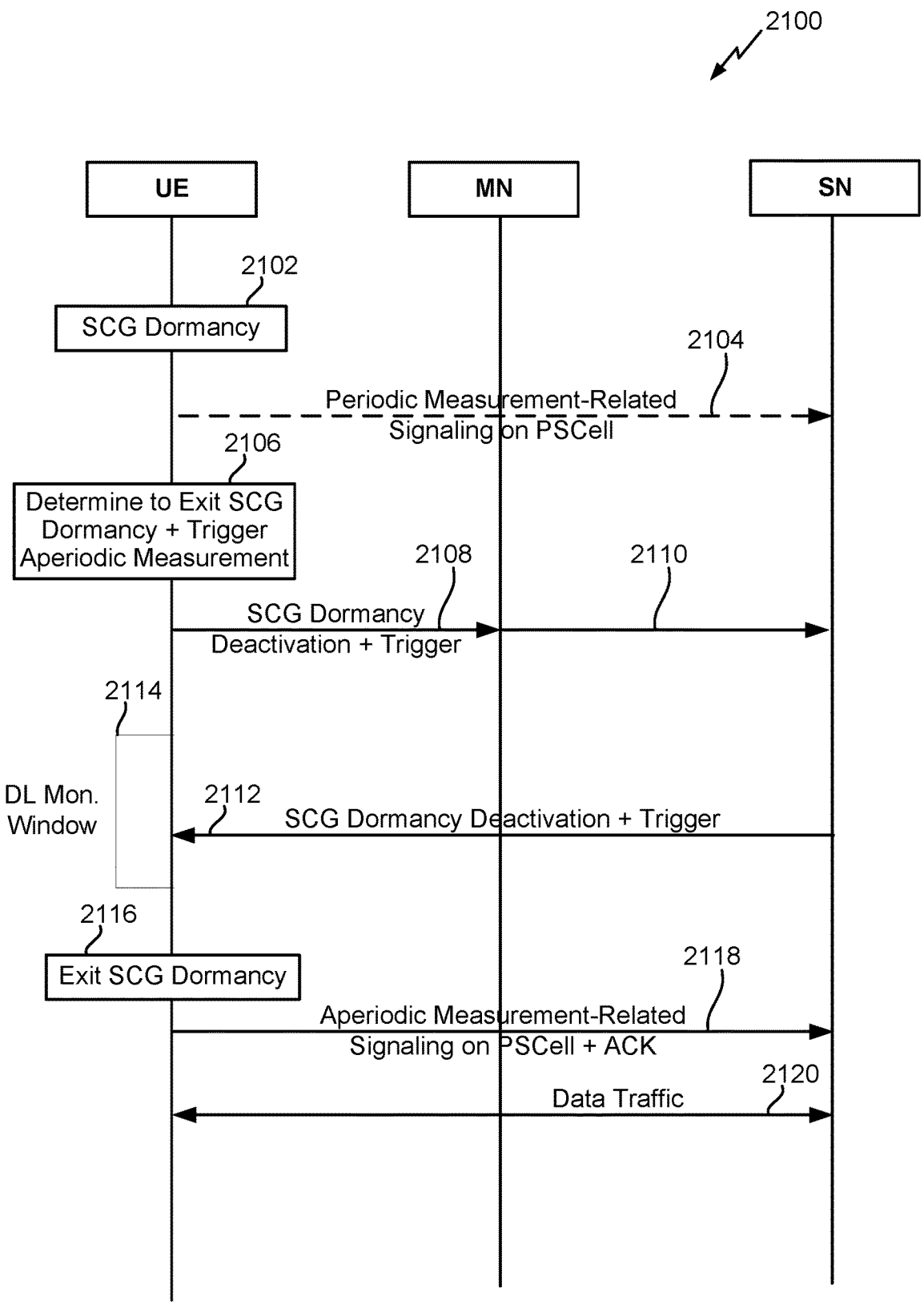

FIG. 21 illustrates an example implementation 2100 of the processes 600-700 of FIGS. 6-7 in accordance with aspects of the disclosure. In particular, FIG. 21 depicts an example where the UE triggers an aperiodic measurement associated with the PSCell and/or SCell(s) of a dormant SCG in association with deactivation of the SCG dormancy while using the MN as a proxy.

Referring to FIG. 21, at 2102, an SCG associated with a UE is in a dormant state. During the SCG dormancy, at 2104, the UE optionally transmits periodic measurement signaling (e.g., transmission of P-SRS, measurement reporting of P-CSI-RS, etc.) to the SN via the PSCell. At 2106, the UE determines to (i) trigger an aperiodic measurement procedure (e.g., transmission of A-SRS, L1 measurement reporting of A-CSI-RS(s) on PSCell and/or SCell(s), etc.) on the PSCell and/or one or more SCell(s) of the dormant SCG, and (ii) to exit SCG dormancy. At 2108, the UE transmits, to the MN via MCG, a trigger for the UE to (i) perform the aperiodic measurement procedure (e.g., transmission of A-SRS, L1 measurement reporting of A-CSI-RS(s) on PSCell and/or SCell(s), etc.) and to (ii) deactivate SCG dormancy. At 2110, the MN forwards the trigger to the SN via backhaul signaling. At 2112, the SN in turn forwards or relays the trigger back to the UE via the PSCell, which is received by the UE on the PSCell during a periodic DL monitoring window 2114. At 2116, the SCG exits dormancy. At 2118, the UE transmits (i) aperiodic measurement-related signaling (e.g., transmission of A-SRS, L1 measurement reporting of A-CSI-RS(s) on PSCell and/or SCell(s), etc.) associated with the PSCell and/or the SCell(s) over the PSCell and (ii) an Out-of Dormancy acknowledgment (ACK) to the SN. At 2120, the UE exchanges data traffic over the PSCell and SCells of the SCG.

One or more embodiments are further directed to beam management associated with an SCG in a dormant state. Such embodiments provide various technical advantages, including improving beam selection in association with measuring a DL RS (e.g., A-CSI-RS or P-CSI-RS) and/or transmitting an UL RS (e.g., A-SRS or P-SRS), and/or transmitting measurement reports (e.g., aperiodic or periodic).

Figure 22:
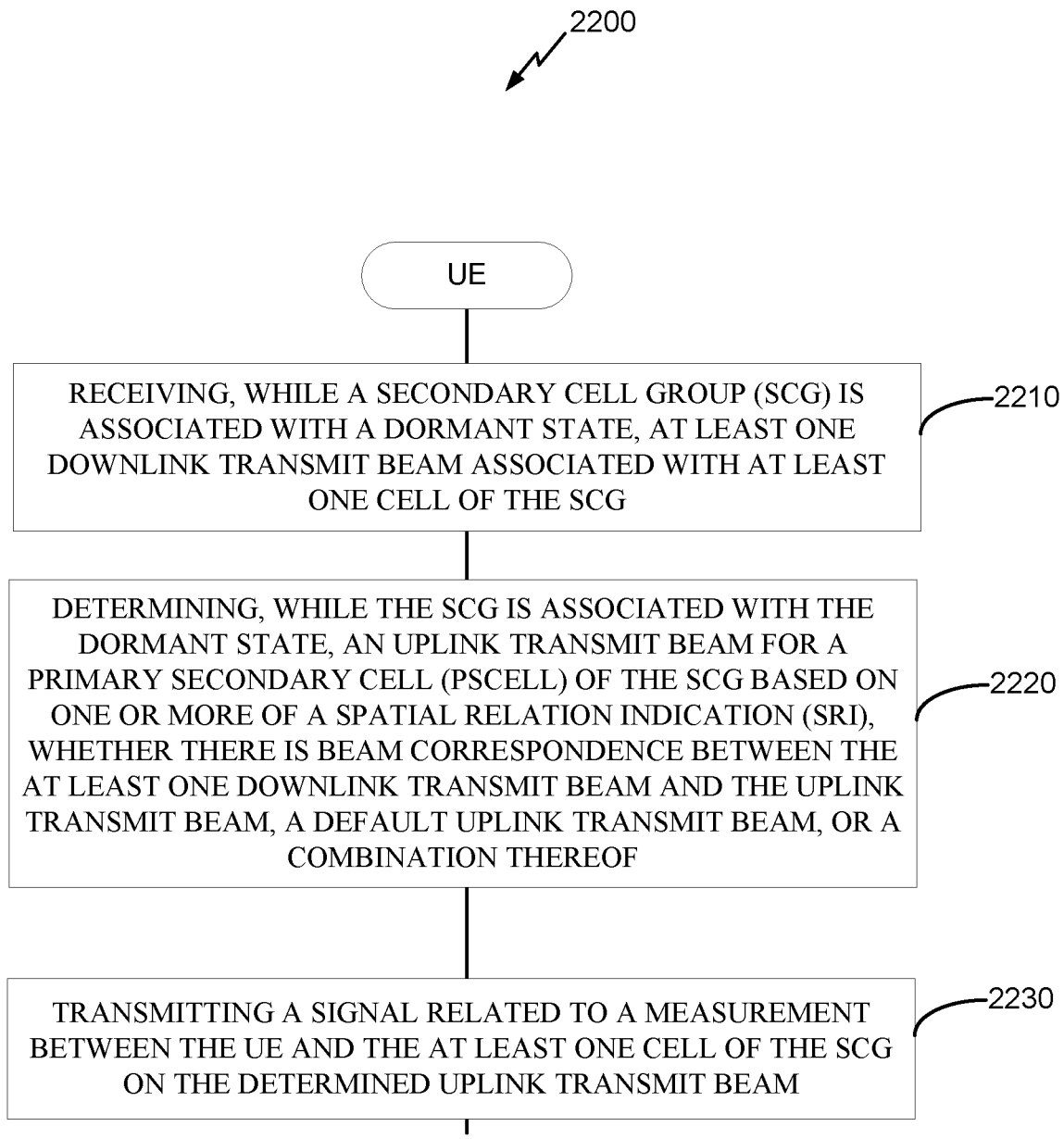
FIG. 22 illustrates an exemplary process of wireless communication, according to aspects of the disclosure.

FIG. 22 illustrates an exemplary process 2200 of wireless communication, according to aspects of the disclosure. In an aspect, the process 2200 may be performed by a UE, such as any of the UEs described above (e.g., UE 302, etc.).

At 2210, UE 302 (e.g., receiver 312, receiver 322, etc.) receives, while a secondary cell group (SCG) is associated with a dormant state, at least one downlink transmit beam associated with at least one cell of the SCG. As will be described below in more detail with respect to FIGS. 23-25, the at least one downlink transmit beam may be associated with cell(s) (e.g., a PSCell and/or one or more SCells) of the SCG. In some designs, the at least one downlink transmit beam may transport signals such as SSB or CSI-RS.

At 2220, UE 302 (e.g., processing system 332, etc.) determines, while the SCG is associated with the dormant state, an uplink transmit beam for a PSCell of the SCG based on one or more of a spatial relation indication (SRI), whether there is beam correspondence between the at least one downlink transmit beam and the uplink transmit beam, a default uplink transmit beam, or a combination thereof.

At 2230, UE 302 (e.g., transmitter 314, transmitter 324, etc.) transmits a signal related to a measurement between the UE and the at least one cell (e.g., PSCell, SCell(s), etc.) of the SCG on the determined uplink transmit beam.

Figure 23:
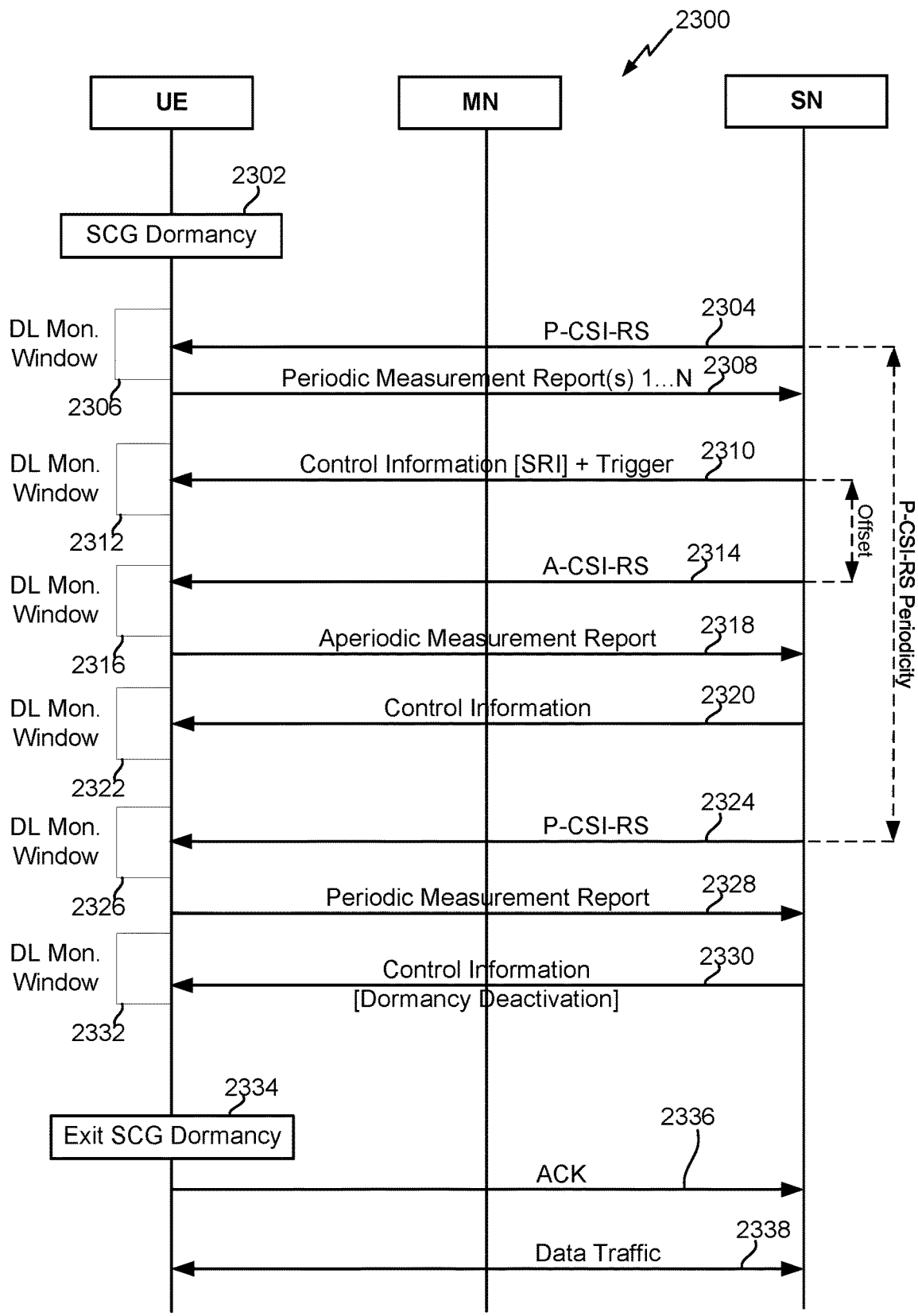
FIGS. 23-25 illustrate example implementations of the process of FIG. 22 in accordance with aspects of the disclosure.

FIG. 23 illustrates an example implementation 2300 of the process 2200 of FIG. 22 in accordance with aspects of the disclosure. At 2302, an SCG associated with a UE is in a dormant state. At 2304, the SN transmits a P-CSI-RS to the UE on the PSCell during a periodic DL monitoring window 2306. At 2308, the UE transmits N periodic measurement reports based on the P-CSI-RS from 2304 to the SN over the PSCell. For example, the N periodic measurement reports may be beam-swept across at least one candidate uplink transmit beam over a plurality of symbols or slots. At 2310, the SN transmits control information (e.g., beam information, timing information, power control information, etc.) along with a trigger to perform an aperiodic measurement procedure (e.g., A-CSI-RS measurement/report), which is received by the UE on the PSCell during periodic DL monitoring window 2312. In some designs, the control information at 2310 may comprise an SRI that designates a particular uplink transmit beam for the PSCell (e.g., to use for measurement reports, SRS, etc.). In some designs, the beam-sweeping at 2308 for UL Tx beam determination may be performed upon entry into SCG dormancy. In some designs, the beam-sweeping at 2308 for UL Tx beam determination may be performed at periodic intervals during SCG dormancy (e.g., to refresh the UL Tx beam), or may be performed on-demand during SCG dormancy. At 2314, the SN transmits an A-CSI-RS on cell(s) (e.g., PSCell and/or SCell(s) of the SCG) in accordance with the trigger from 2310, which is received and measured by the UE during periodic DL monitoring window 2316. At 2318, the UE transmits an aperiodic measurement report based on the A-CSI-RS from 2314 to the SN over the PSCell. At 2324, the SN transmits a P-CSI-RS to the UE on the PSCell during a periodic DL monitoring window 2326. At 2328, the UE transmits a periodic measurement report based on the P-CSI-RS from 2324 to the SN over the PSCell. At 2330, the SN transmits control information (e.g., beam information, timing information, power control information, etc.), which is received by the UE on the PSCell during periodic DL monitoring window 2332. In this case, the control information of 2330 comprises an SCG dormancy deactivation instruction. At 2334, the SCG exits dormancy. At 2336, the UE transmits an Out-of Dormancy acknowledgment (ACK) to the SN. At 2338, the UE exchanges data traffic over the PSCell and SCells of the SCG.

Referring to FIGS. 22-23, in some designs, the signal may comprise a periodic measurement report (e.g., reporting a measurement of a P-CSI-RS from the PSCell, such as 2308 or 2328) or a periodic SRS (e.g., see FIG. 24, below). In some designs, the at least one downlink transmit beam is determined based on beam(s) associated with a system synchronization block (SSB), a signaled transmission configuration indicator (TCI) state associated with a previous P-CSI-RS measurement, or default downlink transmit beam(s).

Referring to FIGS. 22-23, in case of periodic measurements during SCG dormancy, the UE may wake up to monitor the P-CSI every measurement period using DL TX beam(s) obtained from using:

SSB beams,

Signaled TCI states in parameter change message (from previous CSI-measurements), Default beam (e.g., PDSCH beam follows scheduling PDCCH beam if no TCI field in DCI and scheduling offset is greater than threshold PDSCH default beam and PDCCH default beam would be SSB beam).

After measurements, the periodic measurement report (e.g., at 2308, 2328, etc.) is sent using the UL TX beam, e.g.:
- If there is beam correspondence, the uplink TX beam is derived from DL TX beam(s) based on CSI-RS as the QCL source,
- If there is no beam correspondence, the measurement can be used to determine the uplink TX beam (e.g., especially the DMRS in the measurement report may be used). For the first measurement report (e.g., as shown at 2308), the UE may sweep the UL Tx beam on multiple slots (multiple measurement reports), the gNB receives the measurement reports on the uplink finding best UL RX beam and sends the signals the best UL spatial relationship back in an SRI to the UE in a parameter change message.
- If there is no beam correspondence and the UL beam not signaled, the uplink TX beam follow UL default beam which is the TCI states of the CORSET with lowest ID.

In other words, in some designs for periodic measurements, the uplink transmit beam is determined from the at least one downlink transmit beam if there is beam correspondence between the uplink transmit beam and the at least one downlink transmit beam, or the uplink transmit beam is determined from the SRI if there is no beam correspondence between the uplink transmit beam and the at least one downlink transmit beam, or the uplink transmit beam is determined as the default uplink transmit beam if there is no beam correspondence between the uplink transmit beam and the at least one downlink transmit beam and the uplink transmit beam is not signaled via the SRI.

Referring to FIGS. 22-23, in some designs, the gNB may send a parameter update with/without aperiodic measurement trigger. In some designs, periodic measurements are sent to ensure beam updates every period if required.

Referring to FIGS. 22-23, in some designs, in some designs, for aperiodic measurements, the aperiodic measurement triggers (e.g., 2310 of FIG. 23) will include offsets. For the cell(s) of the SCG (e.g., PSCell and/or SCell(s)), the DL TX beam(s) may be based on the last signaled TCI states or default beams if none is signaled. For the UL TX beam, the UE can use the spatial relationship signaled in the SRI. If no signaled spatial relationship and beam correspondence, the UE TX beam will follow the DL TX beam(s) determined from A-CSI measurements. Otherwise, we use the UL default beam is used. In some designs, the gNB only sends DL info to the UE as a response to the periodic measurements/reports (e.g., to minimize the time spent in downlink monitoring). Accordingly, in some designs for aperiodic measurements, the uplink transmit beam is determined from the at least one downlink transmit beam if there is beam correspondence between the uplink transmit beam and the at least one downlink transmit beam and the uplink transmit beam, or the uplink transmit beam is signaled from the SRI if there is beam correspondence between the uplink transmit beam and the at least one downlink transmit beam and the uplink transmit beam, or the uplink transmit beam is determined as the default uplink transmit beam if there is no beam correspondence between the uplink transmit beam and the at least one downlink transmit beam and the uplink transmit beam is not signaled via the SRI. In some designs, the at least one downlink transmit beam is based on a beam associated with a system synchronization block (SSB) or is signaled by the SRI.

Figure 24:
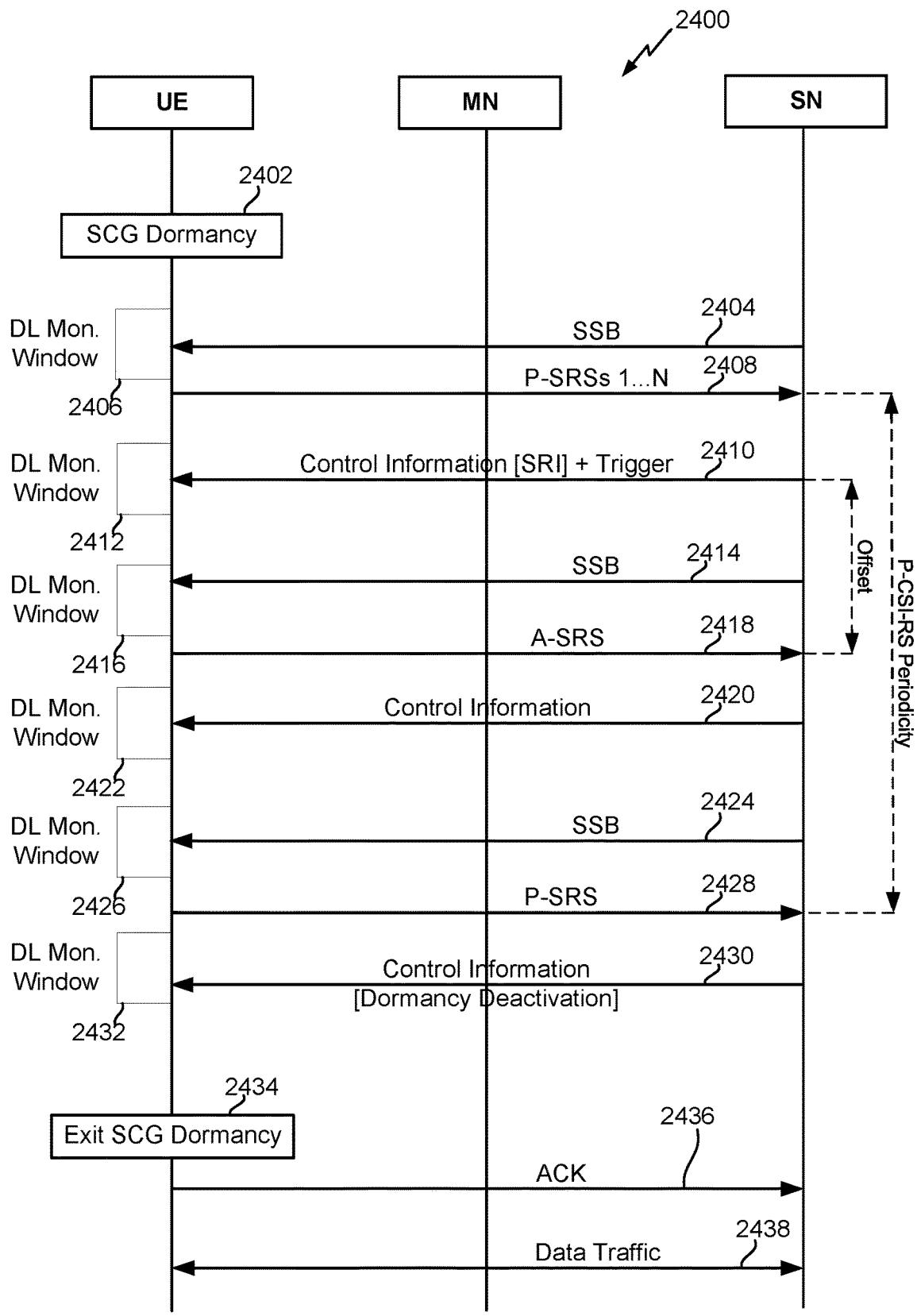

FIG. 24 illustrates an example implementation 2400 of the process 2200 of FIG. 22 in accordance with aspects of the disclosure. At 2402, an SCG associated with a UE is in a dormant state. At 2404, the SN transmits an SSB to the UE on the PSCell during a periodic DL monitoring window 2406. At 2408, the UE transmits N P-SRSs to the SN over the PSCell. For example, the N P-SRSs may be beam-swept across at least one candidate uplink transmit beam over a plurality of symbols or slots. At 2410, the SN transmits control information (e.g., beam information, timing information, power control information, etc.) along with a trigger to perform an aperiodic measurement procedure (e.g., A-SRS transmission on PSCell), which is received by the UE on the PSCell during periodic DL monitoring window 2412. In some designs, the control information at 2410 may comprise an SRI that designates a particular uplink transmit beam for the PSCell (e.g., to use for measurement reports, SRS, etc.). In some designs, the beam-sweeping at 2408 for UL Tx beam determination may be performed upon entry into SCG dormancy. In some designs, the beam-sweeping at 2408 for UL Tx beam determination may be performed at periodic intervals during SCG dormancy (e.g., to refresh the UL Tx beam), or may be performed on-demand during SCG dormancy. At 2414, the SN transmits an SSB to the UE on the PSCell during a periodic DL monitoring window 2416. At 2418, the UE transmits an A-SRS on SCell(s) in accordance with the trigger from 2410, which is received and measured by the SCell(s). At 2420, the SN transmits control information (e.g., beam information, timing information, power control information, etc.), which is received by the UE on the PSCell during periodic DL monitoring window 2422. At 2424, the SN transmits an SSB to the UE on the PSCell during a periodic DL monitoring window 2426. At 2428, the UE transmits a P-SRS to the SN over the PSCell (e.g., with a Tx beam selected based on SSB). At 2430, the SN transmits control information (e.g., beam information, timing information, power control information, etc.), which is received by the UE on the PSCell during periodic DL monitoring window 2432. In this case, the control information of 2430 comprises an SCG dormancy deactivation instruction. At 2434, the SCG exits dormancy. At 2436, the UE transmits an Out-of Dormancy acknowledgment (ACK) to the SN. At 2438, the UE exchanges data traffic over the cell(s) (e.g., PSCell and/or SCell(s)) of the SCG.

Referring to FIGS. 22 and 24, in some designs, for the UL TX beam, e.g.:
- for the first transmission(s), multiple P-SRSs would sent to the gNB and the gNB would respond with UL spatial relationship signaled in an SRI using the parameter change message,
- If no signaled spatial relationship and with beam correspondence, the UE use follows DL TX beam(s) which is QCLed with SSB as the source, and
- Otherwise, UE follows the UL Tx default/common beam.
and for the DL TX beam, e.g., QCL source for the downlink beam is SSB, so the UE determines the DL TX beam(s) using the SSBs. SSB measurements can be measured before the SRS transmission but this is not necessary.

Referring to FIGS. 22 and 24, in some designs, gNB can indicate that opportunities for beam management are allowed during the P-SRS transmission and a follow-up message. In some designs, P-SRS periodicity may be chosen such that the RX/TX beam is relatively unchanged during this period. In some designs, no beam management is done on the SCells since SRS is transmitted on the PSCell. In some designs, a UE DL monitoring opportunity may be tied to P-SRS transmission.

Figure 25:
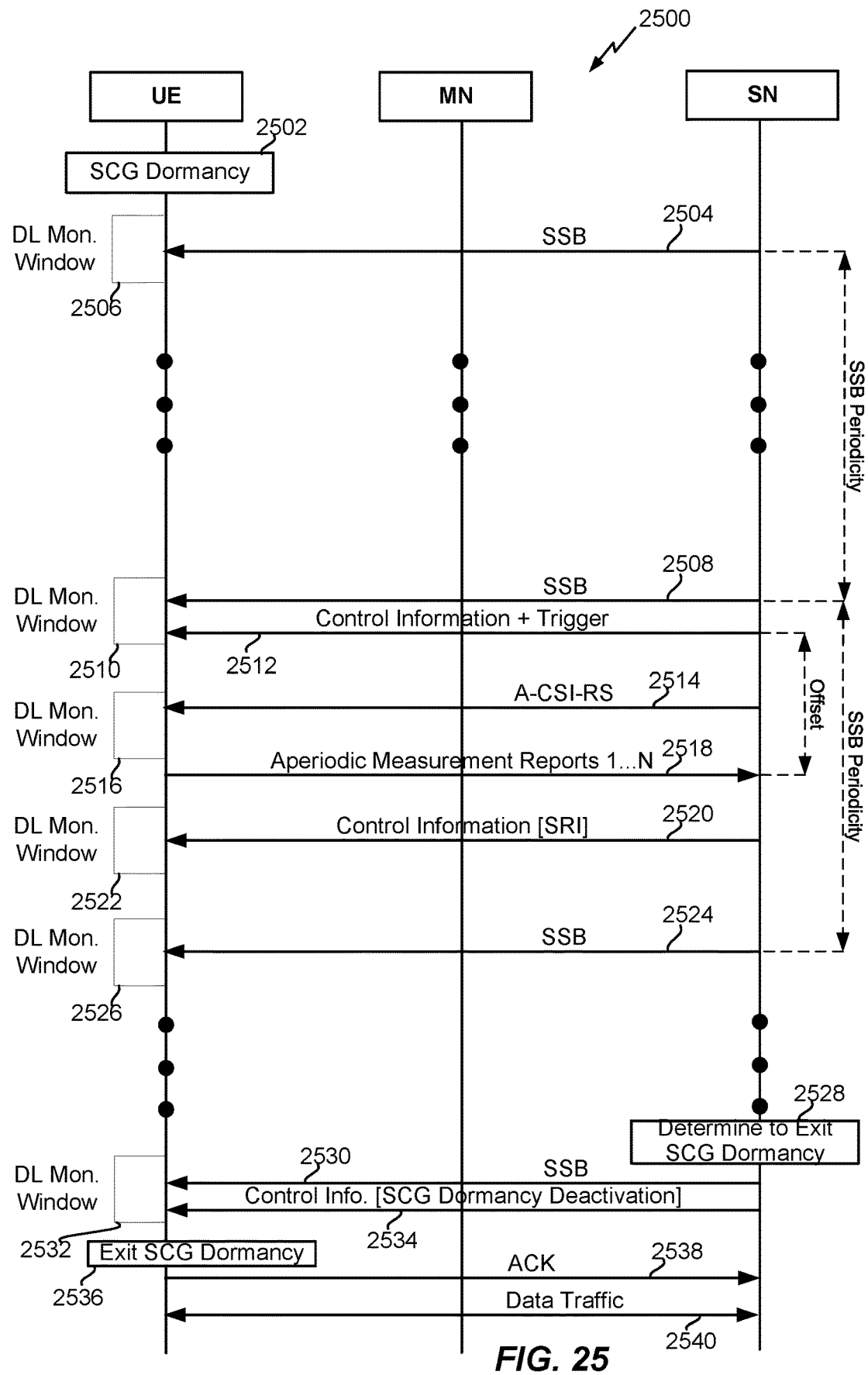

FIG. 25 illustrates an example implementation 2200 of the process 2200 of FIG. 22 in accordance with aspects of the disclosure. Unlike FIGS. 23-24, neither P-CSI-RS nor P-SRS are configured in this embodiment.

At 2502, an SCG associated with a UE is in a dormant state. At 2504, the SN transmits an SSB to the UE on the PSCell during a periodic DL monitoring window 2506. 2504-2506 may then repeat a number of times while the SCG remains dormant. At 2508, the SN transmits an SSB to the UE on the PSCell during a periodic DL monitoring window 2510. At 2512, the SN further transmits control information (e.g., beam information, timing information, power control information, etc.) along with a trigger to perform an aperiodic measurement procedure (e.g., A-CSI-RS measurement/report), which is also received by the UE on the PSCell during periodic DL monitoring window 2510. At 2514, the SN transmits an A-CSI-RS on cell(s) (e.g., PSCell and/or SCell(s)) in accordance with the trigger from 2512, which is received and measured by the UE during periodic DL monitoring window 2516. At 2518, the UE transmits N aperiodic measurement reports based on the A-CSI-RS from 2514 to the SN over the PSCell. For example, the N periodic measurement reports may be beam-swept across at least one candidate uplink transmit beam over a plurality of symbols or slots. At 2520, the SN transmits control information (e.g., beam information, timing information, power control information, etc.), which is received by the UE on the PSCell during periodic DL monitoring window 2522. In some designs, the control information at 2520 may comprise an SRI that designates a particular uplink transmit beam for the PSCell (e.g., to use for measurement reports, SRS, etc.). In some designs, the beam-sweeping at 2520 for UL Tx beam determination may be performed upon entry into SCG dormancy. In some designs, the beam-sweeping at 2518 for UL Tx beam determination may be performed at periodic intervals during SCG dormancy (e.g., to refresh the UL Tx beam), or may be performed on-demand during SCG dormancy. At 2524, the SN transmits an SSB to the UE on the PSCell during a periodic DL monitoring window 2526. At this point, 2520-2524 may repeat for a period of time during the SCG dormancy.

At 2528, the SN determines to exit SCG dormancy. At 2530, the SN transmits an SSB to the UE on the PSCell during a periodic DL monitoring window 2532. At 2534, the SN further transmits control information (e.g., beam information, timing information, power control information, etc.) along with a trigger to perform an aperiodic measurement procedure (e.g., A-CSI-RS measurement/report), which is also received by the UE on the PSCell during periodic DL monitoring window 2532. In this case, the control information of 2534 comprises an SCG dormancy deactivation instruction. At 2536, the SCG exits dormancy. At 2538, the UE transmits an Out-of Dormancy acknowledgment (ACK) to the SN. At 2540, the UE exchanges data traffic over the cells (e.g., PSCell and/or SCell(s)) of the SCG.

Referring to FIGS. 22 and 25, in some designs, during the periodic DL monitoring window, the UE monitors SSBs and DL channels (PDCCH/PDSCH). In some designs, the aperiodic measurement trigger and configuration can be sent to the UE during the DL monitoring window with is tied to the periodic monitoring SSB. In some designs, the DL TX beams are set based on periodic SSB measurements, or SRI beam updates signaled due to measurement CSI-RS reports. In some designs, the UL TX beams are set as follows:

With beam correspondence, UL TX beam follows DL TX beam(s),

Without correspondence, UE sends multiple PUCCH, the gNB determines the best UL beam and signals to the UE in SRI, or If no beam correspondence and no SRI based on PUCCH transmissions, UE relies on the default/common beam.

FIG. 26 depicts a table 2600 summarizing the various beam management aspects of FIGS. 22-25 in accordance with an aspect of the disclosure.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a user equipment (UE), comprising:
   receiving, while a secondary cell group (SCG) is associated with a dormant state, at least one downlink transmit beam associated with at least one cell of the SCG;
   determining, while the SCG is associated with the dormant state, an uplink transmit beam for a primary secondary cell (PSCell) of the SCG based on (i) a spatial relation indication (SRI), (ii) a beam correspondence condition between the at least one downlink transmit beam and the uplink transmit beam and (iii) a default uplink transmit beam; and
   transmitting a signal related to a measurement between the UE and the at least one cell of the SCG on the determined uplink transmit beam.

2. The method of claim 1,
   wherein the at least one cell comprises the PSCell.

3. The method of claim 1, wherein the signal comprises a periodic measurement report or a periodic sounding reference signal (P-SRS).

4. The method of claim 3, wherein the at least one downlink transmit beam is associated with one or more periodic channel state information reference signals (P-CSI-RSs).

5. The method of claim 3,
   wherein the uplink transmit beam is determined from the at least one downlink transmit beam if there is beam correspondence between the uplink transmit beam and the at least one downlink transmit beam, or
   wherein the uplink transmit beam is determined from the SRI if there is no beam correspondence between the uplink transmit beam and the at least one downlink transmit beam, or
   wherein the uplink transmit beam is determined as the default uplink transmit beam if there is no beam correspondence between the uplink transmit beam and the at least one downlink transmit beam and the uplink transmit beam is not signaled via the SRI.

6. The method of claim 1, wherein the signal comprises an aperiodic measurement report or an aperiodic sounding reference signal (A-SRS).

7. The method of claim 6,
   wherein the uplink transmit beam is determined from the at least one downlink transmit beam if there is beam correspondence between the uplink transmit beam and the at least one downlink transmit beam,
   wherein the uplink transmit beam is signaled from the SRI if there is beam correspondence between the uplink transmit beam and the downlink transmit beam and the uplink transmit beam, or
   wherein the uplink transmit beam is determined as the default uplink transmit beam if there is no beam correspondence between the uplink transmit beam and the at least one downlink transmit beam and the uplink transmit beam is not signaled via the SRI.

8. The method of claim 6, wherein the downlink transmit beam is based on a beam associated with a system synchronization block (SSB) or is signaled by the SRI.

9. A method of operating a user equipment (UE), comprising:
   receiving, while a secondary cell group (SCG) is associated with a dormant state, at least one downlink transmit beam associated with at least one cell of the SCG;
   determining, while the SCG is associated with the dormant state, an uplink transmit beam for a primary secondary cell (PSCell) of the SCG based on (i) a spatial relation indication (SRI), (ii) a beam correspondence condition between the at least one downlink transmit beam and the uplink transmit beam and (iii) a default uplink transmit beam; and
   transmitting a signal related to a measurement between the UE and the at least one cell of the SCG opportunistically on the determined uplink transmit beam,
   wherein the signal comprises a periodic measurement report or a periodic sounding reference signal (P-SRS),
   wherein the at least one downlink transmit beam is associated with one or more periodic channel state information reference signals (P-CSI-RSs), and
   wherein the at least one downlink transmit beam is based on a beam associated with a system synchronization block (SSB), a signaled transmission configuration indicator (TCI) state associated with a previous P-CSI-RS measurement, or a default downlink transmit beam.

10. A method of operating a user equipment (UE), comprising:
    receiving, while a secondary cell group (SCG) is associated with a dormant state, at least one downlink transmit beam associated with at least one cell of the SCG;
    determining, while the SCG is associated with the dormant state, an uplink transmit beam for a primary secondary cell (PSCell) of the SCG based on (i) a spatial relation indication (SRI), (ii) a beam correspondence condition between the at least one downlink transmit beam and the uplink transmit beam and (iii) a default uplink transmit beam;

transmitting a signal related to a measurement between the UE and the at least one cell of the SCG opportunistically on the determined uplink transmit beam, wherein the signal comprises a periodic measurement report or a periodic sounding reference signal (P-SRS), wherein the uplink transmit beam is determined from the at least one downlink transmit beam if there is beam correspondence between the uplink transmit beam and the at least one downlink transmit beam, or wherein the uplink transmit beam is determined from the SRI if there is no beam correspondence between the uplink transmit beam and the at least one downlink transmit beam, or wherein the uplink transmit beam is determined as the default uplink transmit beam if there is no beam correspondence between the uplink transmit beam and the at least one downlink transmit beam and the uplink transmit beam is not signaled via the SRI;

beam-sweeping, while the SCG is associated with the dormant state, a message to the PSCell across at least one candidate uplink transmit beam over a plurality of symbols or slots; and receiving the SRI designating the uplink transmit beam in response to the beam-sweeping.

11. The method of claim 10, wherein the beam-swept message comprises a measurement report or a sounding reference signal (SRS).

12. A method of operating a user equipment (UE), comprising:

receiving, while a secondary cell group (SCG) is associated with a dormant state, at least one downlink transmit beam associated with at least one cell of the SCG;

determining, while the SCG is associated with the dormant state, an uplink transmit beam for a primary secondary cell (PSCell) of the SCG based on (i) a spatial relation indication (SRI), (ii) a beam correspondence condition between the at least one downlink transmit beam and the uplink transmit beam and (iii) a default uplink transmit beam;

transmitting a signal related to a measurement between the UE and the at least one cell of the SCG opportunistically on the determined uplink transmit beam, wherein the signal comprises an aperiodic measurement report or an aperiodic sounding reference signal (A-SRS), wherein the uplink transmit beam is determined from the at least one downlink transmit beam if there is beam correspondence between the uplink transmit beam and the at least one downlink transmit beam, wherein the uplink transmit beam is signaled from the SRI if there is beam correspondence between the uplink transmit beam and the downlink transmit beam and the uplink transmit beam, or wherein the uplink transmit beam is determined as the default uplink transmit beam if there is no beam correspondence between the uplink transmit beam and the at least one downlink transmit beam and the uplink transmit beam is not signaled via the SRI;

beam-sweeping, while the SCG is associated with the dormant state, a message to the PSCell across at least one candidate uplink transmit beam over a plurality of symbols or slots; and receiving the SRI designating the uplink transmit beam in response to the beam-sweeping.

13. The method of claim 12, wherein the beam-swept message comprises a measurement report or a sounding reference signal (SRS).

14. A user equipment (UE), comprising:
at least one memory comprising instructions;
at least one transceiver; and
at least one processor configured to execute the instructions to cause the UE to:
receive, via the at least one transceiver and while a secondary cell group (SCG) is associated with a dormant state, at least one downlink transmit beam associated with at least one cell of the SCG;
determine, while the SCG is associated with the dormant state, an uplink transmit beam for a primary secondary cell (PSCell) of the SCG based on (i) a spatial relation indication (SRI), (ii) a beam correspondence condition between the at least one downlink transmit beam and the uplink transmit beam and (iii) a default uplink transmit beam; and
transmit a signal related to a measurement between the UE and the at least one cell of the SCG on the determined uplink transmit beam.

* * * * *